(12) United States Patent
Reinsch

(10) Patent No.: US 6,412,860 B1
(45) Date of Patent: Jul. 2, 2002

(54) OPENABLE MOTOR VEHICLE ROOF

(75) Inventor: Burkhard Reinsch, Kaufbeuren (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/855,840

(22) Filed: May 16, 2001

(30) Foreign Application Priority Data

May 16, 2000 (DE) .......................................... 100 23 864

(51) Int. Cl.$^7$ .................................................. B60J 7/00
(52) U.S. Cl. .................. 296/219; 296/223; 296/107.09; 296/107.19
(58) Field of Search ............................... 296/219, 223, 296/224, 107.09, 107.18, 107.19

(56) References Cited

U.S. PATENT DOCUMENTS

| 2,210,590 A | * | 8/1940 | Jobst ....................... 296/219 X |
| 2,434,711 A | * | 1/1948 | Mobbs et al. ................ 296/222 |
| 5,558,388 A | * | 9/1996 | Furst et al. .............. 296/223 X |

FOREIGN PATENT DOCUMENTS

| EP | 0 755 815 B1 | 1/1997 | |
| JP | 404293619 | * 10/1992 | .................. 296/219 |

* cited by examiner

Primary Examiner—Dennis H. Pedder
(74) Attorney, Agent, or Firm—Nixon Peabody LLP; David S. Safran

(57) ABSTRACT

A folding top of a motor vehicle with a roof frame with side roof rails, on which at least one movable roof element is movably supported, and which can be pivoted relative to the main part of the roof frame and can be detached from the windshield apron for lowering the folding top has a locking mechanism (9) for locked fixing of the side roof rails on the apron and with a drive for locking and unlocking the locking mechanism (9). Here, it is provided that the drive has an at least two-part drive line (71, 75) which extends from the main part (6) of the roof frame to a locking part (9) which can be fixed on the apron (8) along the side roof rail (2), and a coupling (74) with which the forward part (71) of the drive line supported on the side roof rail can be coupled to the rear part (75) of the drive line which can be driven for locking and unlocking and which is supported on the main part (6) of the roof frame, in the pivoted-out position of the side roof rail, and can be separated for pivoting in the side roof rail.

18 Claims, 33 Drawing Sheets

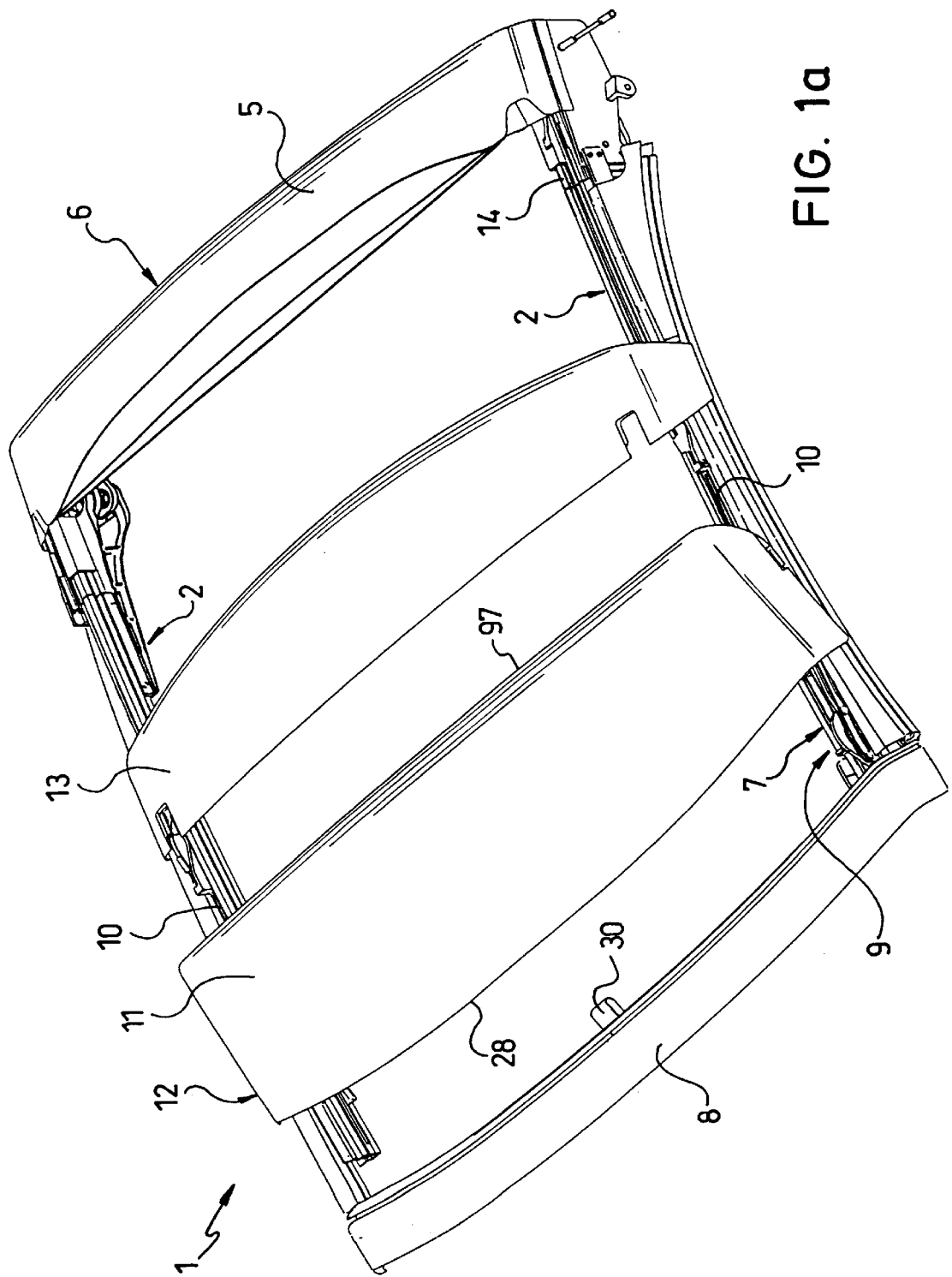

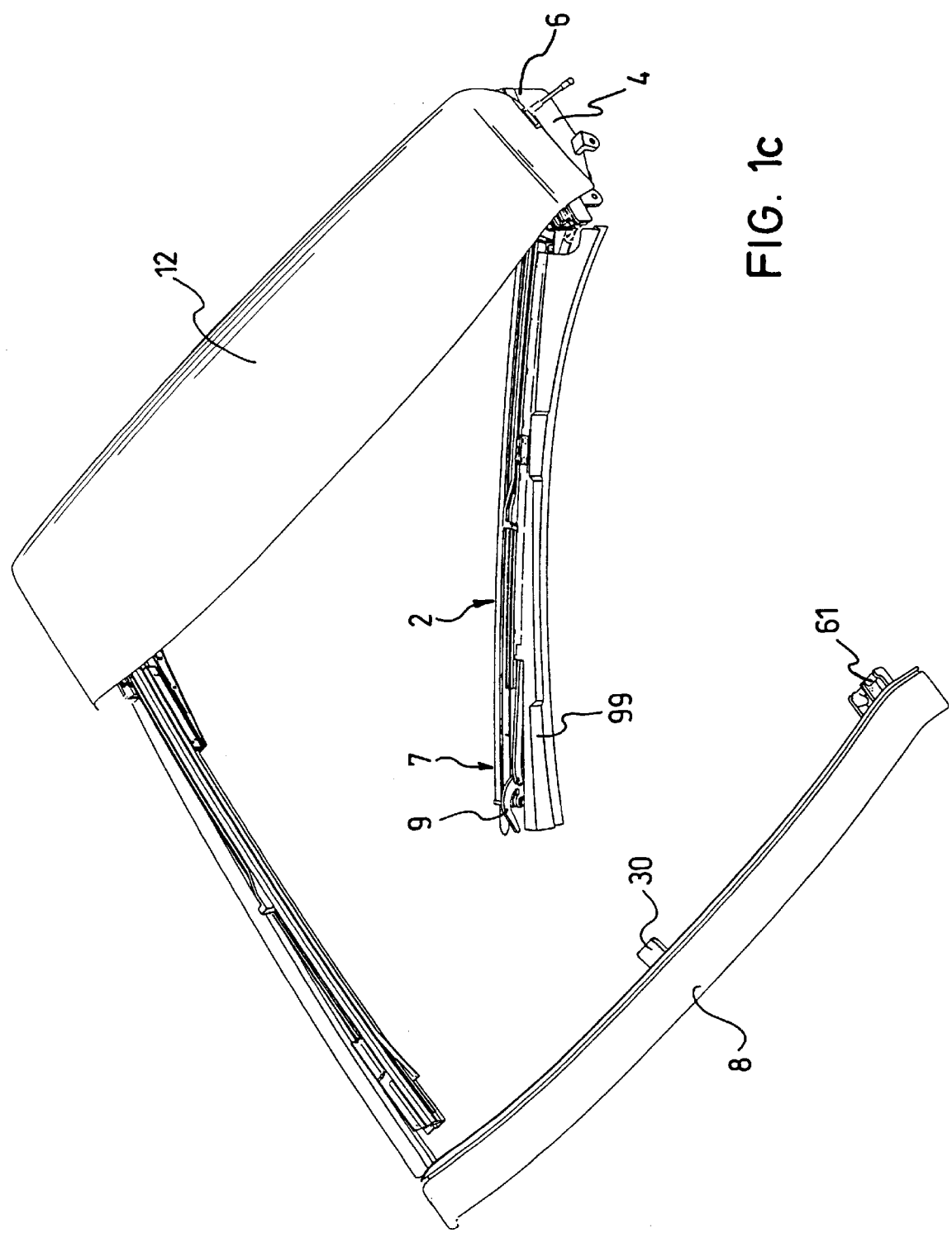

OPENABLE MOTOR VEHICLE ROOF

BACKGROUND OF THE INVENTION

1. Field of the Invention

The invention relates to an openable motor vehicle roof with a front movable roof element which is movably supported on side roof rails and which, in the closed position of the roof, can be placed against an apron or the like.

2. Description of Related Art

Published European Patent Application EP 0 755 815 A1 discloses a folding roof for motor vehicles which has a folding convertible top for selectively closing or at least partially clearing a roof opening which is made in the fixed roof surface; the front end of the top, in the form of a front end bow, forms a roof peak which is adjustably guided along guide rails which run in the lengthwise direction of the motor vehicle, and in the closed position of the roof, is pressed with its front edge against a roof-mounted abutment. On each of the guide rails, a respective carriage is guided which is permanently connected to a drive cable and which is coupled via a pivot lever to the front end of the roof peak. The pivot lever is guided on a guideway of the guide rail such that, in the displacement area of the folding roof, between the open position and an intermediate position near the closed position, it executes purely translational motion, and in the area between the intermediate position and the closed position, it executes a combined translational and rotational motion. By rotating the pivot lever, the roof peak, which is raised with its front edge and which rests on the carriage on its back end, is lowered on its front end and pressed against a contact surface or a frame seal of the roof frame with high force by the combined translational and rotational motion. The pivot lever, on the one hand, controls the raising or lowering motion of the front edge of the roof peak by its engagement in the guideway, and on the other hand, applies the force for pressing the front edge of the roof peak to the latter. In this combined mechanism, the defect is that the front edge of the roof peak, when the convertible top is opened, is immediately lifted and raised almost vertically so that the airstream can be captured in it. In addition, the raised front edge adversely affects the visual appearance.

SUMMARY OF THE INVENTION

A primary object of the present invention is to devise an openable motor vehicle roof of the initially mentioned type which has an improved movement mechanism in regard to the opening and closing of the front roof element in the vicinity of the apron.

Another object of the invention is to develop the initially mentioned openable motor vehicle roof with at least one intermediate bow which is movably supported on the side roof rails such that an improved motion sequence is ensured when the front roof element and the intermediate bow are moved.

The initially mentioned object is achieved as in accordance with the invention in that the roof element is guided by a guide means which is supported on the guide rails of the side roof rails in the opening and closing process from or to the apron such that the front edge of the roof element is moved essentially tangentially to the outside roof skin. The front edge of the front roof element is pressed by its essentially tangential motion when the roof is closed from the rear against the apron and especially against the apron seal, being moved on or near the roof contour, and thus, not forming a significant projection in which the airstream can be caught. Essentially tangential motion is also defined as motion with a comparatively small slope with reference to the outside roof skin. In this motion, the front edge of the roof element is always kept lower than its rear edge. Thus, these movements, which can be accomplished by the guide means, differ fundamentally from the upwardly directed pivoting motion of the front edge of the roof element around the rear pivot axis according to the initially mentioned prior art. Instead of an apron, there can be any transverse part which is located on the body or on the top edge of the front window and which is suited for tight contact with the roof element, a seal being feasibly attached to this transverse part.

Preferably, the guide means, in a further opening process, lifts a rear edge of the front roof element relative to its front edge. In this way, the roof element is tilted around the transverse axis in the manner of a spoiler. During further translational motion of the roof element to the rear, it can be moved in its oblique position at least partially over the nearest movable roof element, for example, an intermediate bow, and can be moved with it in a compact arrangement into a rear lowered position. When the roof element is raised, at the same time, the front edge is raised along a path segment from a sealing flange which runs on the outside on the side roof rail so that freedom is ensured for the continuing displacement motion of the roof element.

The motion of the front edge of the roof element can be controlled, for example, in an openable fixed roof which has a sliding roof or a louvered roof for selectively closing or at least partially clearing a roof opening on a path of movement which is essentially parallel to the guide rail. In other forms of roofs, for example, in the folding roof of a convertible, in one advantageous embodiment, according to the curvature of the roof and the formation of the side roof rails, the motion of the front edge of the roof element, which edge is tilted at an angle or is essentially tangential to the outside roof skin, can take place nonparallel to the guide rail.

One preferred embodiment calls for the guide means to have a four-bar mechanism by means of which the roof element is supported to be able to pivot on a carriage which is supported to be able to move lengthwise on the guide rail by a drive, and for the control lever of the four-bar mechanism engaged to the control crank to swing the roof element during the lengthwise displacement of the carriage. The four-bar mechanism can be adapted for any form of the roof and can be designed for a certain motion sequence. It is simple and durable and offers high operating safety.

The control crank is feasibly located on the side roof rail and is formed especially on the guide rail.

The initially mentioned object is achieved in that the roof element is supported by a guide means on the guide rails of the side roof rails, the guide means each having a four-bar mechanism by means of which the roof element is movably supported on a carriage which can be moved on the guide rail, and that a control lever of the four-bar mechanism controls the motion of the four-bar mechanism and of the roof element especially in the opening or closing motion away from or to the apron depending on the position of the carriage to the guide rail. The four-bar mechanism enables adjustment of different motion sequences of the roof element in the vicinity of the apron, for example, initial motion of the front roof element which is largely tangential to the outside roof skin in the area of the apron. On the other hand, spoiler-like raising of the roof element can also take place.

In one preferred embodiment of the invention, there is a support device for fixing the front roof element on the apron;

this device has at least one support unit which is located on the apron and on the roof element, and which has an oblong support part which projects in the direction of motion of the roof element and an assigned support part receiver. The support device offers vertical centering of the front roof element in its closed position on the apron between the outer bearings of the roof element on the side roof rails. At least one support unit is preferably located in the middle area of the apron or of the roof element so that it can direct the wind forces acting on the roof element and the sealing forces largely normally to the support part on the apron. Thus, the wind load or the sealing force is applied directly to the apron.

The support device forms an additional, simply built passive support without movable elements. The front roof element can be made in a lightweight structure with low tolerance requirements by means of the support. A certain flexibility of the roof element is thus allowable since the roof element is moved flush to the apron in its correct form by the support device and by the closing forces. Thus, the production tolerances can be equalized by the support. When several support units are used, optimum adaptation to the apron can be achieved.

Feasibly, the projecting support part is located on the apron and the support part receiver is located on the roof peak. To largely preclude the danger of injury by the projecting support part, it is advantageous if a protective bead is located on the inside of the motor vehicle adjacent to the support part. The protective bead sufficiently covers the support part and is made especially with extensive rounding which prevents injuries in the case of impact of the passengers. Preferably, the projecting support part is a support tongue located on the apron or a pin.

The second object is achieved by the intermediate bow being fixed on the guide rail of the respective side roof rail, in the closed position of the roof, by the front roof element releasing the intermediate bow in its opening motion and entraining it into a rear position, and by the front roof element being moved by a drive part which is movably supported on the guide rail and which controls coupling and de-coupling. Folding of a folding roof can be controlled by the forcibly controlled fixing and moving of the shaped parts of the roof, such as the front roof element and the intermediate bow, so that larger, untensioned fabric surfaces of the folding roof which could cause fluttering of the roof can be avoided.

Preferably, the bearing means of the intermediate bow has a locking means with which the intermediate bow can be fixed by controlling the drive part on the guide rail, or can be fixed on the front roof element after unlocking from the guide rail.

The locking means can be a locking block arrangement which contains a spring-loaded blocking element which can be actuated especially by the drive part and which controls the unlocking of the intermediate bow from the guide rail.

The front roof element of the motor vehicle roof in accordance with the invention can be the roof peak of a folding roof, especially of the folding roof of the folding top of a convertible, a louvered roof element or the cover of a sliding and lifting roof.

One embodiment of the motor vehicle roof is explained in detail below with reference to the drawings.

BRIEF DESCRIPTION OF THE DRAWINGS

FIG. 1a is a perspective view of the folding top in an intermediate open position of the folding roof;

FIG. 1c is a perspective view of the folding top in the opened position of folding roof and with a side rail which swings inward;

FIG. 25 is an enlarged perspective view of the coupling means of the locking means with the drive rods de-coupled and with the side roof rail swung partially in;

FIG. 26 is another view of the coupling means shown in FIG. 25 with the side roof rail swung partially in;

FIG. 27 is a top view of the de-coupled coupling means with the side roof rail swung partially in;

DETAILED DESCRIPTION OF THE INVENTION

Figure 1:
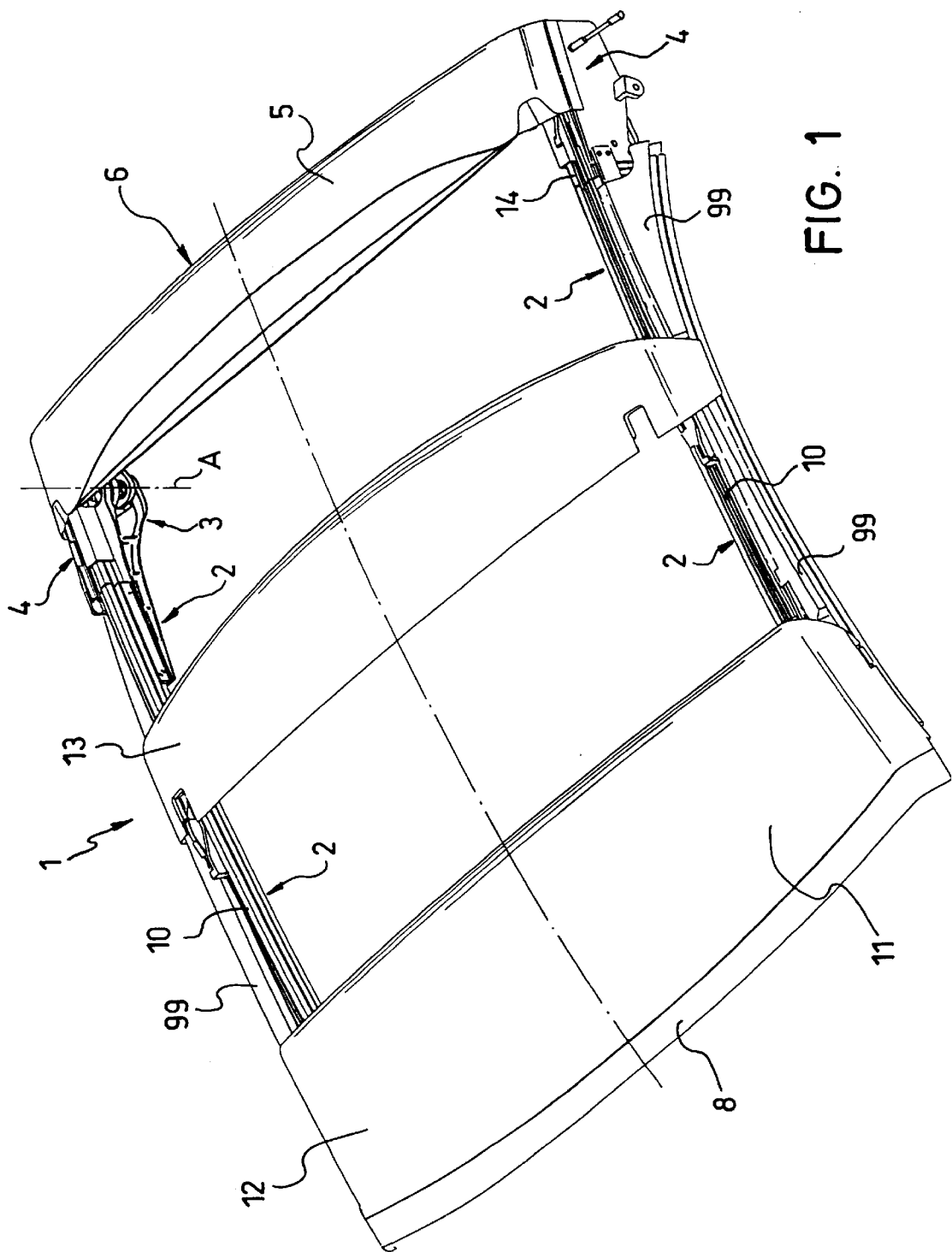
FIG. 1 is a perspective view of a folding top of a convertible which has a folding roof in the closed position of the folding roof.

The folding top of a convertible contains a folding roof 1 with a roof peak 12, at least one intermediate bow 13, and a main bow 5 (see FIG. 1). The top material (not shown) is attached to the roof peak 12, the intermediate bow 13 and the main bow 5 and is kept tensioned over them in the closed state of the folding top 1. The folding roof 1, which is made essentially symmetrical to the vertical lengthwise center plane of the motor vehicle (see FIG. 1), contains a roof frame with side roof rails 2 which are located on both sides and which are attached on their back ends 3 to the respective roof frame side parts 4 to pivot around a roughly vertical axis A. The two opposing roof frame side parts 4 are permanently joined to one another by the main bow 5 which extends transversely over the roof and with them form the main roof frame part or a roof cassette 6 which is pivotally mounted on the body via a bearing which is located between the roof frame side parts 4 and the body, for example, a four-bar mechanism which has a main connecting rod and an auxiliary connecting rod (not shown), and can be lowered into a rear storage space for depositing the opened folding roof 1 with the roof frame side parts 4 swung in onto the roof cassette 6.

On the front end 7 of each side roof rail 2, in the closed position (FIG. 1), or in the partially open position of the folding roof 1 which is shown in FIG. 1a, is located on the front cross beam or the apron 8 on the top edge of the front window or in the area of the top end of the A columns and is anchored with a locking means 9 thereto.

Figure 1B:
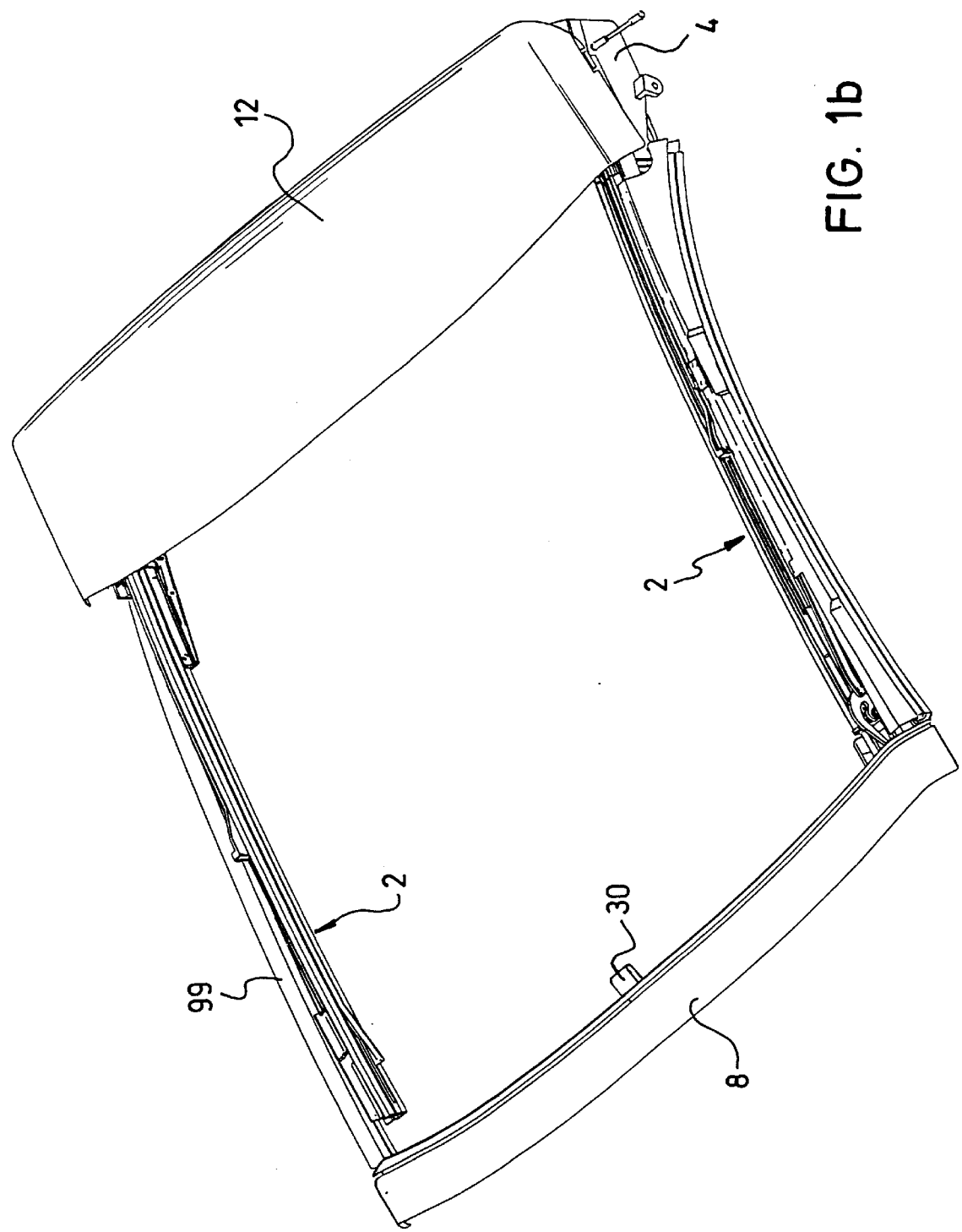
FIG. 1b is a perspective view of the folding top in the opened position of folding roof.

Each side roof rail 2 contains an external sealing flange 99 for tight contact of the bows and the top material, and a guide rail 10 on which the front bow 11 of the roof peak 12 of the folding roof 1 and at least one intermediate bow 13 are movably supported. To completely open the folding roof 1, the roof peak 12 is moved along the guide rail 10 to the rear against the intermediate bow 13, and then move as a unit from the guide rail 10 on the side roof rail 2 onto a guide rail section 14 on the roof cassette 6 (see FIGS. 1a & 1b), so that after unlocking the locking means 9 on the front end 7 of the side roof rail 2, it can be pivoted inward around the vertical pivot axis A of its pivot bearing to in front of the roof cassette 6 (FIG. 1c). Together with the opposing, likewise pivoted-in side roof rail, the roof cassette 6 is lowered with the entire folding roof 1 into the receiving space.

Figure 5:
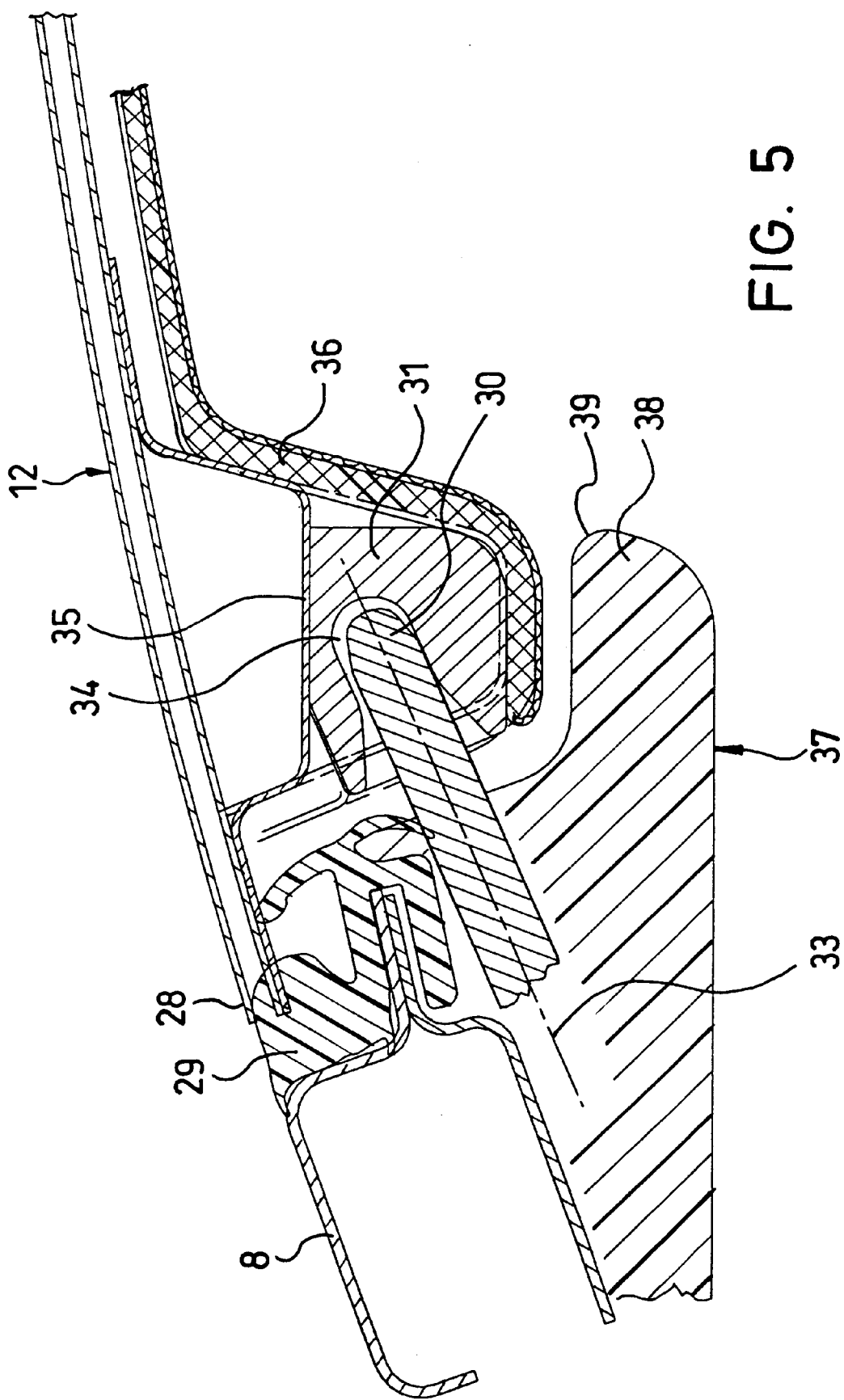
FIG. 5 is a perspective view of an apron with a centering means for the roof peak.

The roof peak 12 is supported to be able to swing via a connecting rod 15 and a control lever 16 of the four-bar mechanism on a carriage 17 (see FIG. 2) which is movably attached to the guide rail 10 of the side roof rail 2. Here, the front connecting rod 15 of the four-bar mechanism is supported on the front pivot bearing 18 on the carriage 17 and on the pivot bearing 19 on a holding device 20 of the roof peak 12. The control lever 16 is supported on a rear pivot bearing 21 on the carriage 17 and on a pivot bearing 22 on the holding device 20 of the roof peak 12, and has a lower extension 23 on which a slide block 24 fits into the guide path 25 which is laterally open to the inside and which is located on the guide rail 10. The main section 26 of the guide path 25 runs essentially over the entire length parallel to the guide rail 10 for the carriage 17 and contains a front control section 27 which runs downward at an angle relative to the main section 26 in the direction toward the front end 7 of the side roof rail 2. In the closed position of the folding roof 1 shown in FIG. 2, the carriage 17 is located on the front end 7 of the guide rail 10 or of the side roof rail 2. At the same time, the slide block 24 is located on the front end of the control section 27 of the guide path 25, by which the control lever 16 is swung into its lower closed position. The forward edge 28 of the roof peak 12 is pressed against a seal 29 on the apron 8 by the layout of the four-bar mechanism (see also FIG. 5).

To open the folding roof 1, the carriage 17 is moved to the rear along the guide rail 10. In doing so, the slide block 24 slides in the control section 27 of the guide path 25 against the main section 26 of the guide path 25 and pivots the control lever 16 upward into the position shown in FIG. 3 in which maximum pivoting of the control lever 16 is achieved and is preserved as the carriage 17 continues to be displaced.

Figure 2:
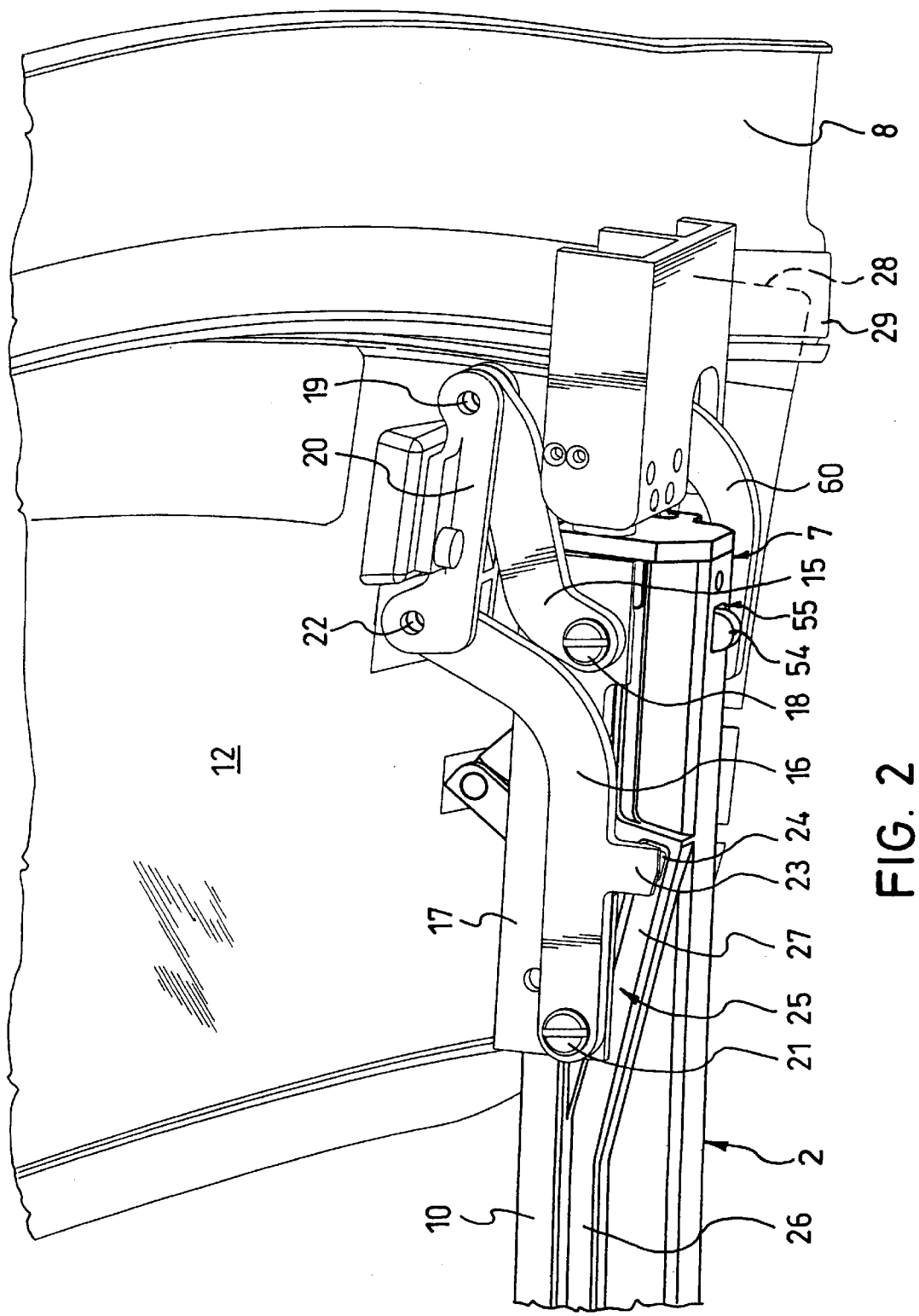
FIG. 2 is a perspective view of an inner side of the front section of a side roof rail of the folding roof.
Figure 3:
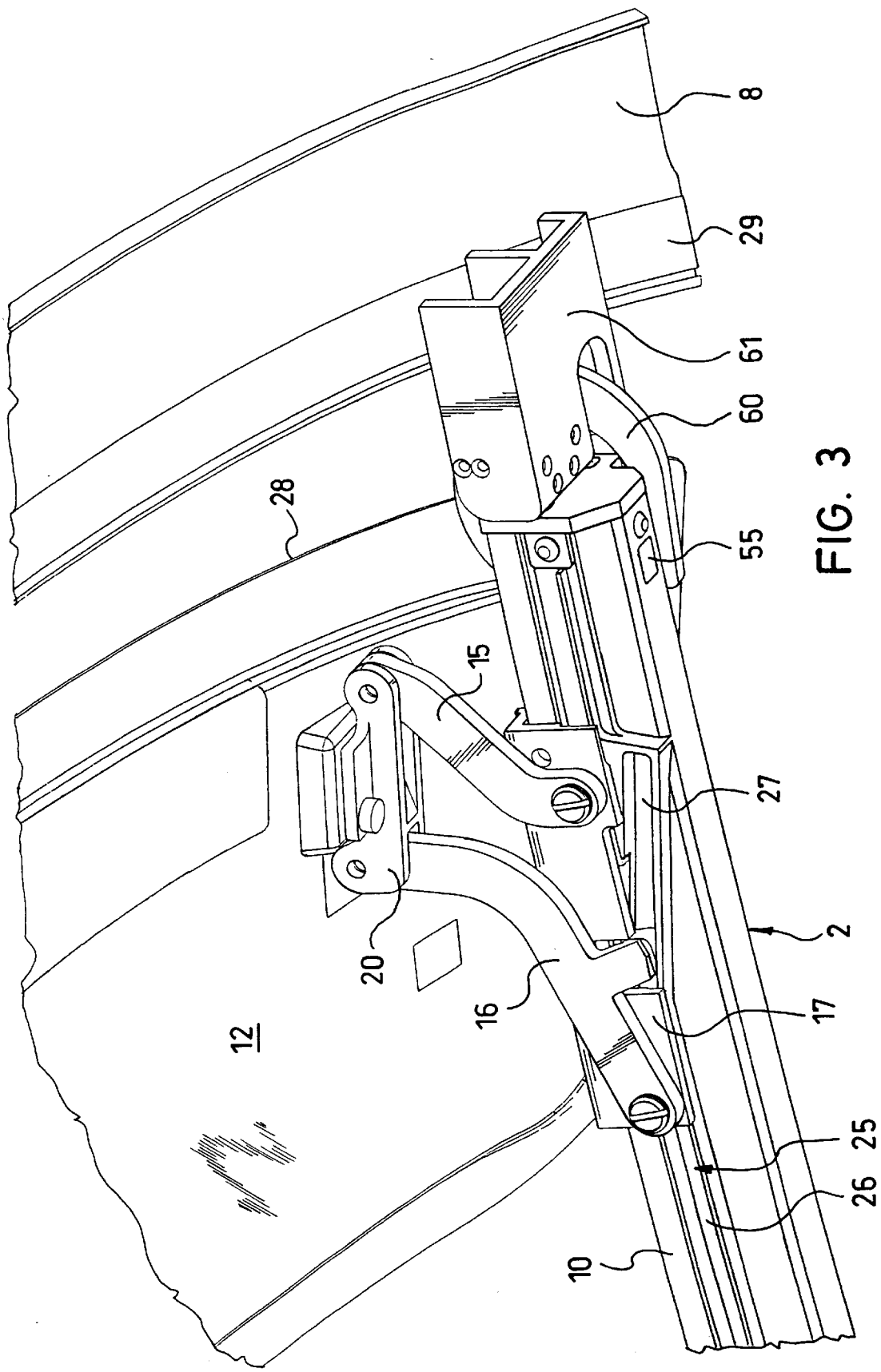
FIG. 3 is a perspective view of the inner side of the front section of the side roof rail with a changed position of the roof peak (partial opening)
Figure 3A:
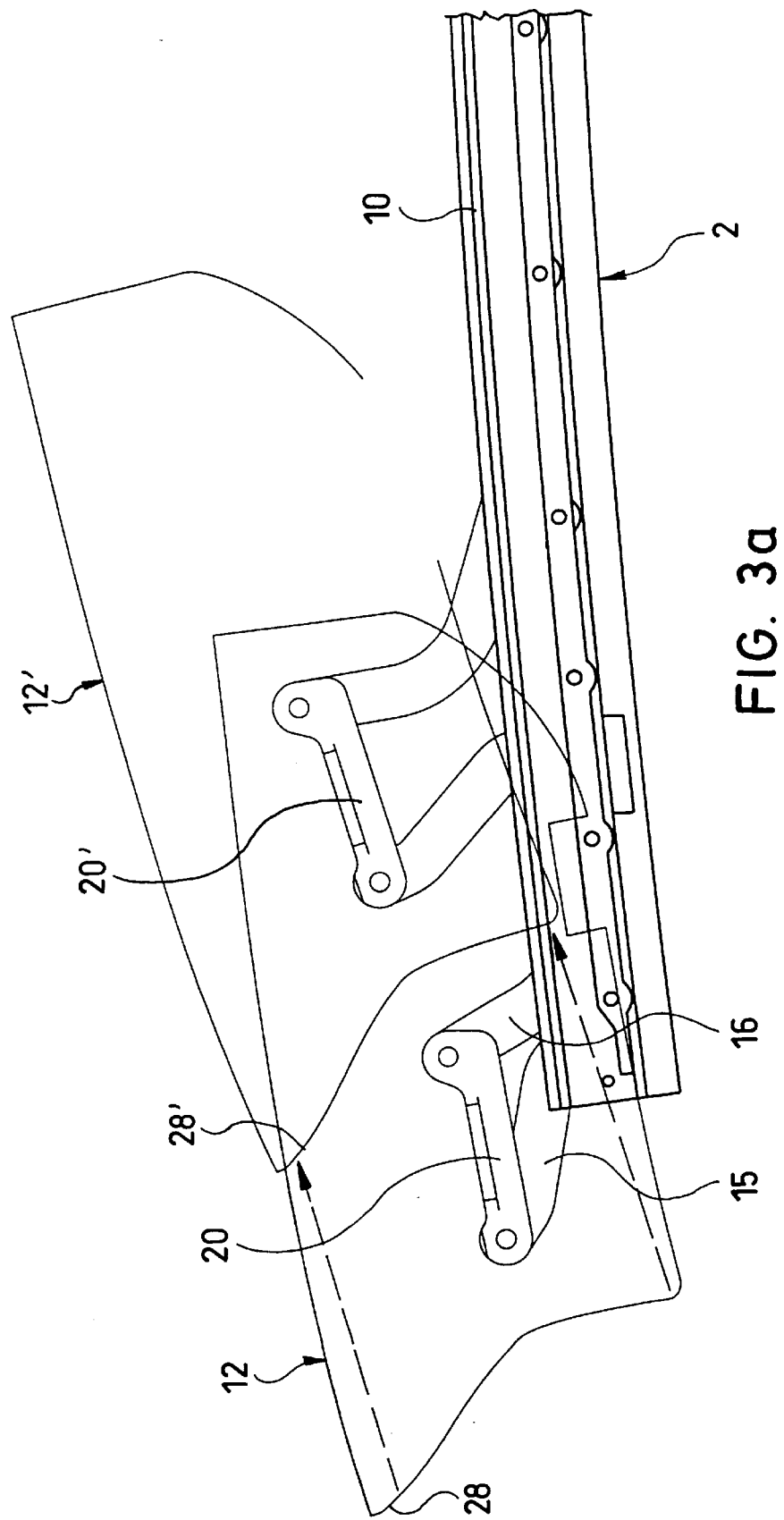
FIG. 3a is a perspective view of the roof peak in two superimposed positions of motion.

By means of the chosen layout of the four-bar mechanism, the roof peak 12, and especially its front edge 28, are guided between the positions as shown in FIGS. 2 & 3 (which are drawn on top of one another as the forward arrangement of the roof peak 12 and as the rear arrangement of the roof peak 12' with the front edges 28 and 28' in FIG. 3a in a schematic view) by the superposition of the linear displacement of the carriage 17 on an essentially linear path which runs at an comparatively small acute angle to the guide rail 10 and which forms essentially a tangent to the roof skin in the transition area from the apron 8 to the closed roof peak 12 and the pivoting of the roof peak 12.

Figure 4:
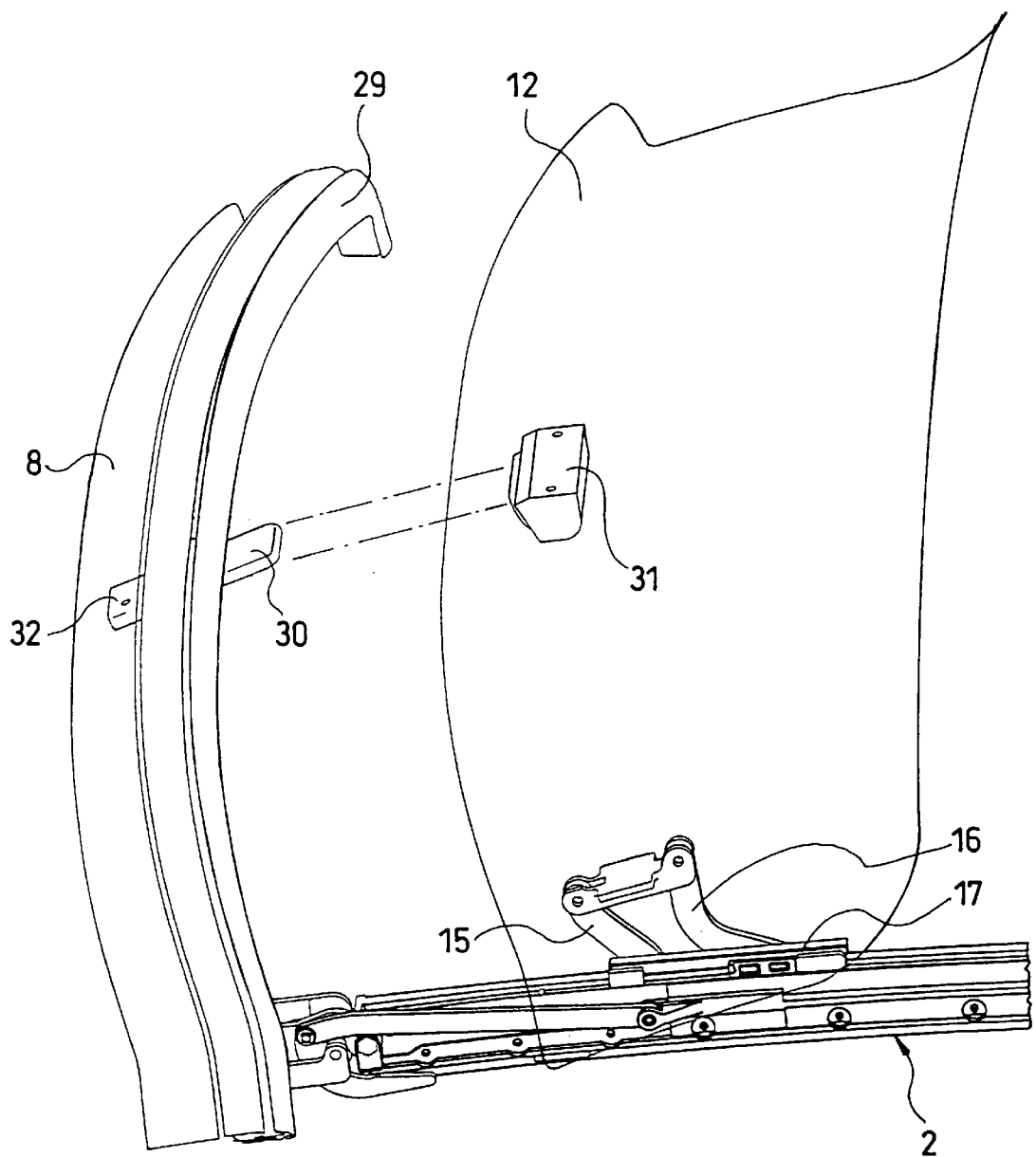
FIG. 4 is a perspective view of the front section of the folding top of the motor vehicle from above.

A centering and support means for centered fixing of the roof tip 12 on the apron 8 (see FIGS. 4 & 5) contains a centering tongue 30 which is attached to the apron 8 in the vertical center plane of the motor vehicle and a centering bearing 31 which is attached to the roof peak 12 for centered holding of the centering tongue 30. The centering tongue 30 is attached to a bearing part 32 of the apron 8 and projects underneath the apron seal 29 along a plane 33 which is essentially parallel to the initial opening motion of the front edge 28 of the roof peak 12. The centering bearing 31 has a recessed centering receiver 34 which, with the roof peak 12 closed, is aligned towards the centering tongue 30 and surrounds the front end of the centering tongue 30 so that the middle of the roof peak 12 is centered in a direction normal to the outside roof skin and is kept supported against unwanted deformation, such as bulging, for example. In addition, the centering tongue 30 in the centering bearing 31 on its right and left side can be kept centered relative to the vertical center plane of the vehicle. The centering bearing 31 is attached to a reinforcement 35 of the roof peak 12 and is covered to the inside by a soft inside lining 36. The inside lining 37 which covers the apron 8 towards the passengers projects underneath the centering tongue 30 as a protective bead 38 beyond the latter, and has a rounded section 39 so that the danger of injury when a body part of the passenger encounters it is reduced.

Figure 6:
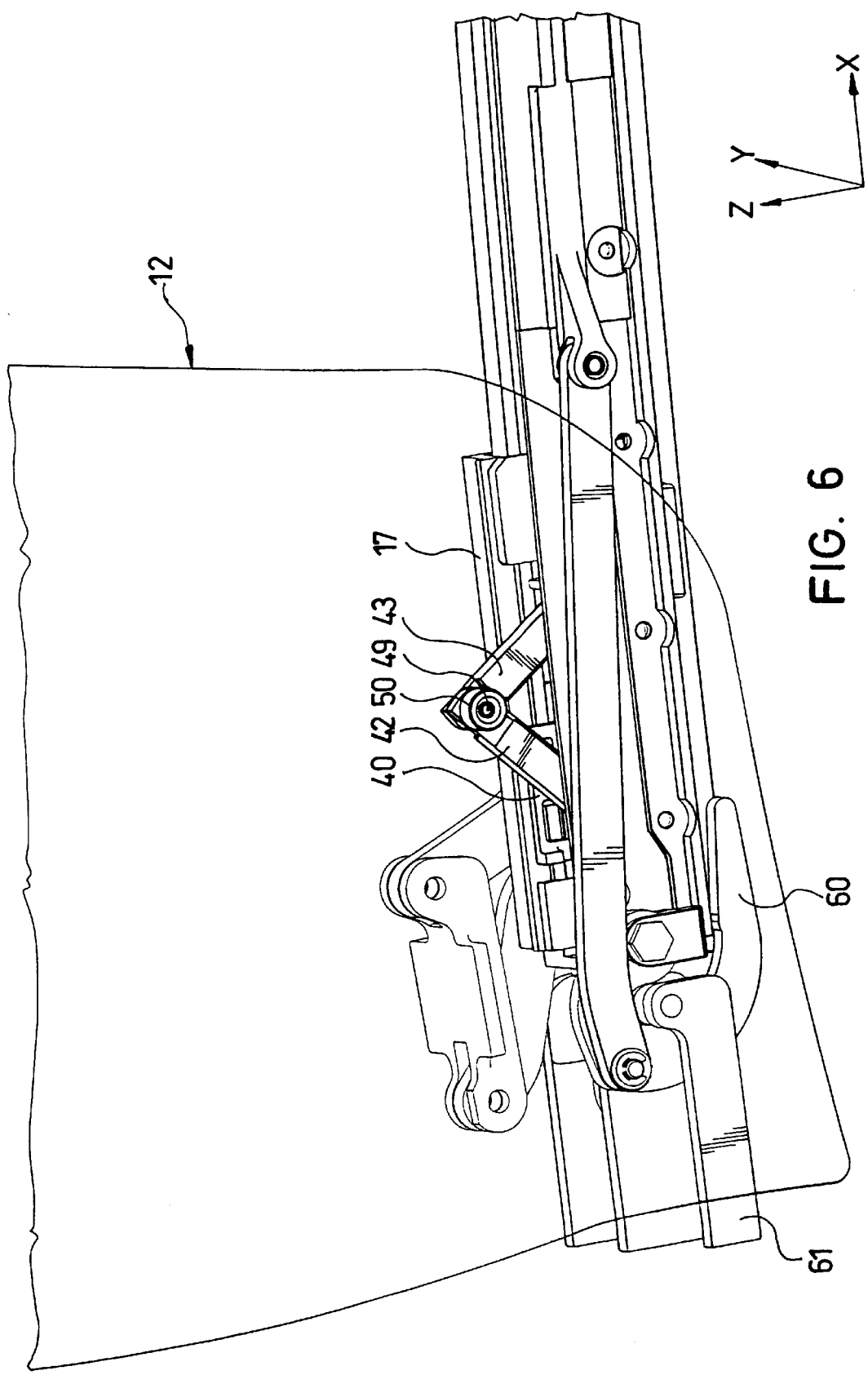
FIG. 6 is a perspective view of the front section of the side roof rail.
Figure 7:
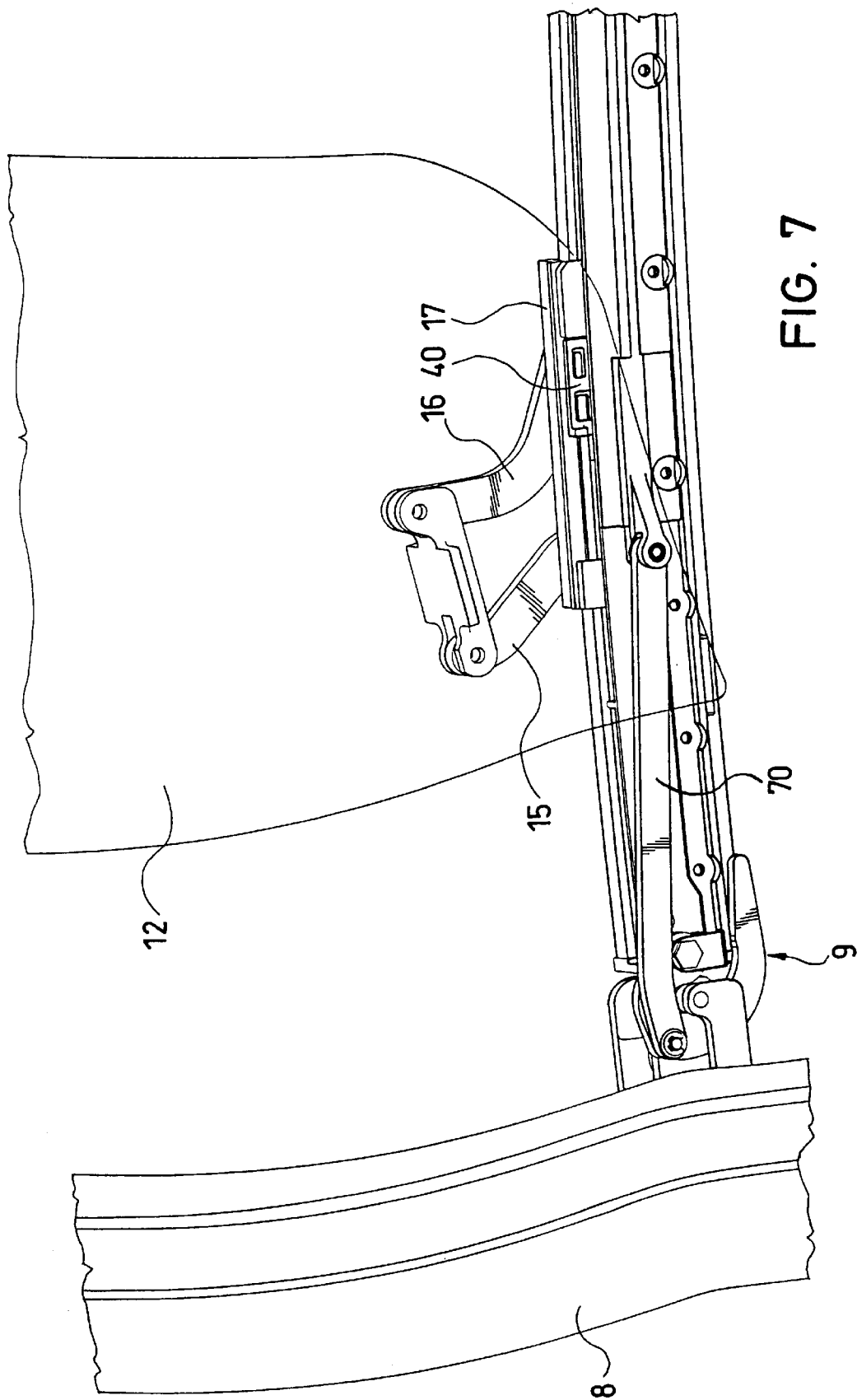
FIG. 7 is a perspective view from above of the front section of the side roof rail with a position of the support of the roof peak which has been altered compared to FIG. 6.
Figure 9:
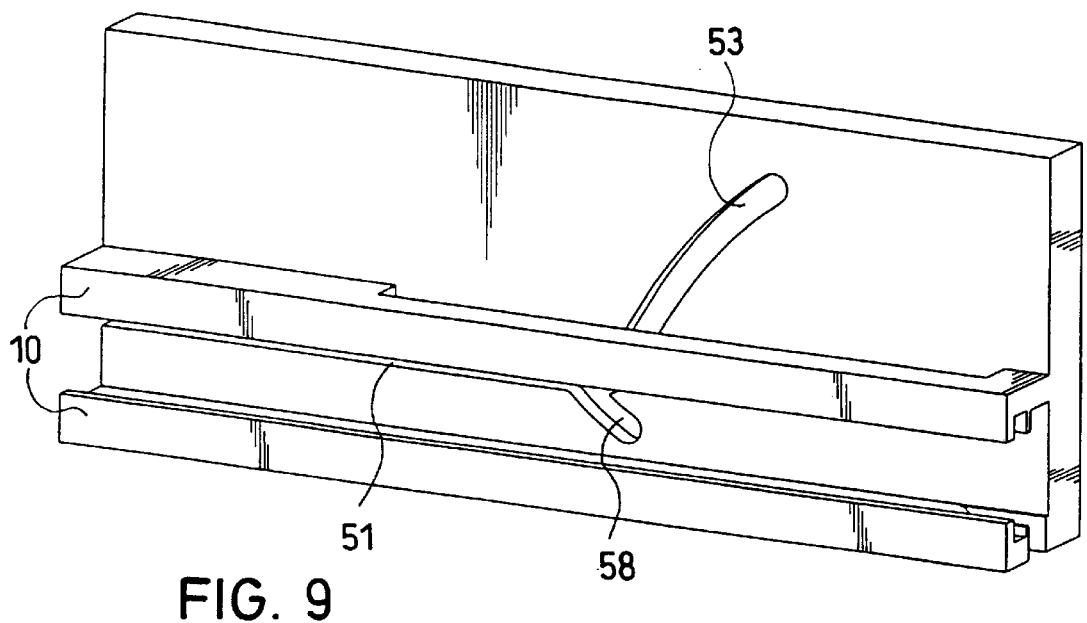
FIG. 9 is a view like that of FIG. 8, but with elements removed to show a control section for the toggle lever coupling and top tensioning means on the front end of a guide rail which is located on the side roof rail.
Figure 10:
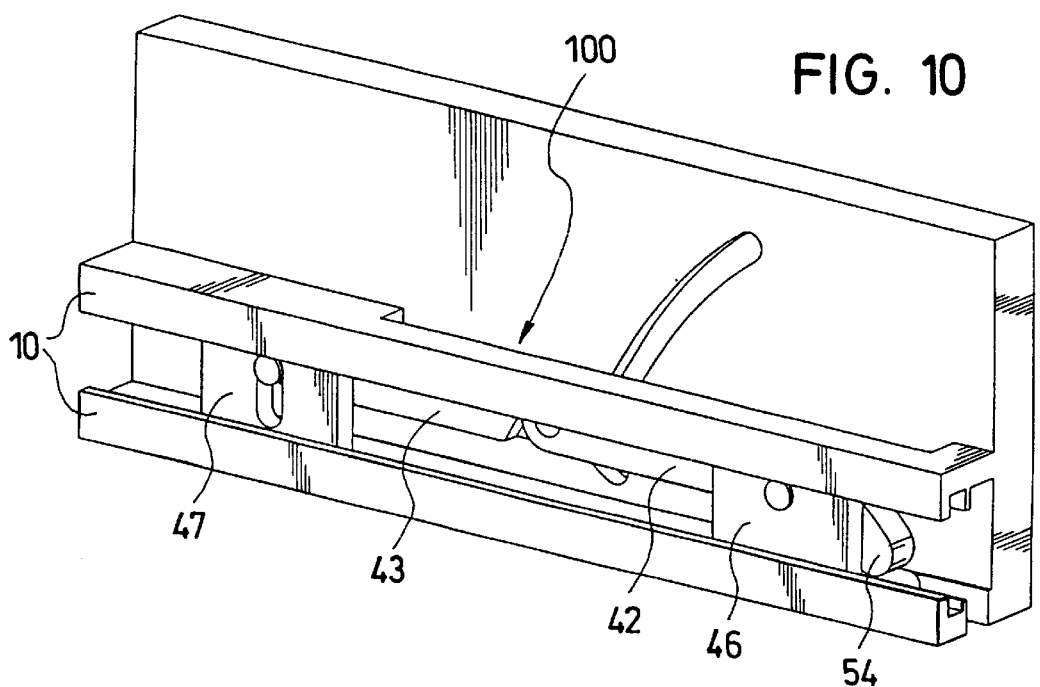
FIG. 10 is a view as shown in FIG. 8, but with the toggle lever coupling and top tensioning means in another position of motion.
Figure 24:
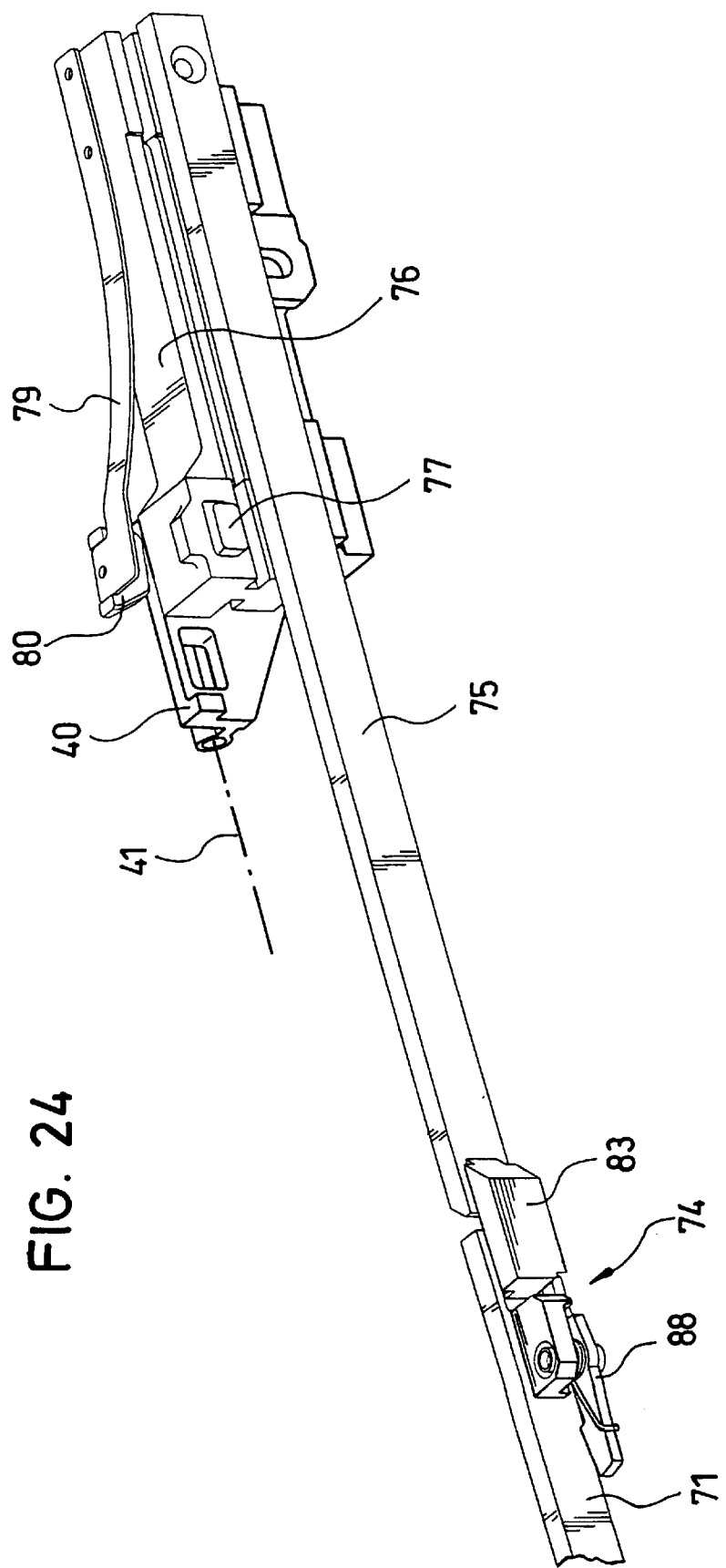
FIG. 24 is a perspective view of the rear section of the locking means with the coupling means and the drive section.
Figure 25:
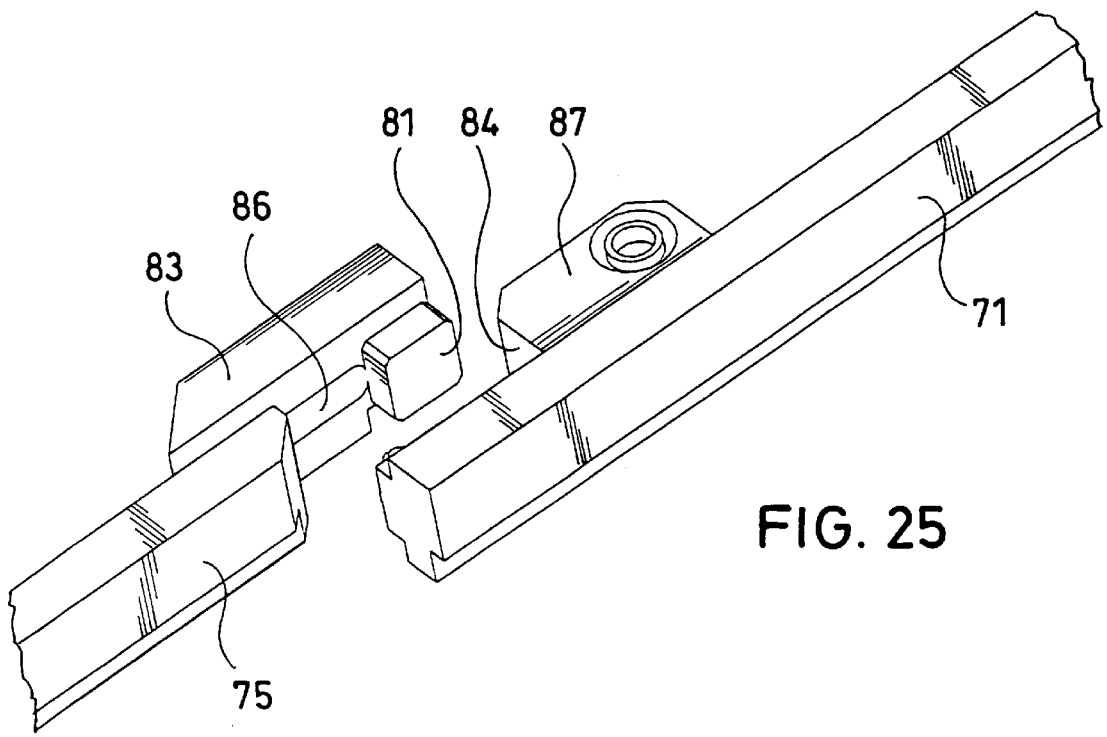
Figure 26:
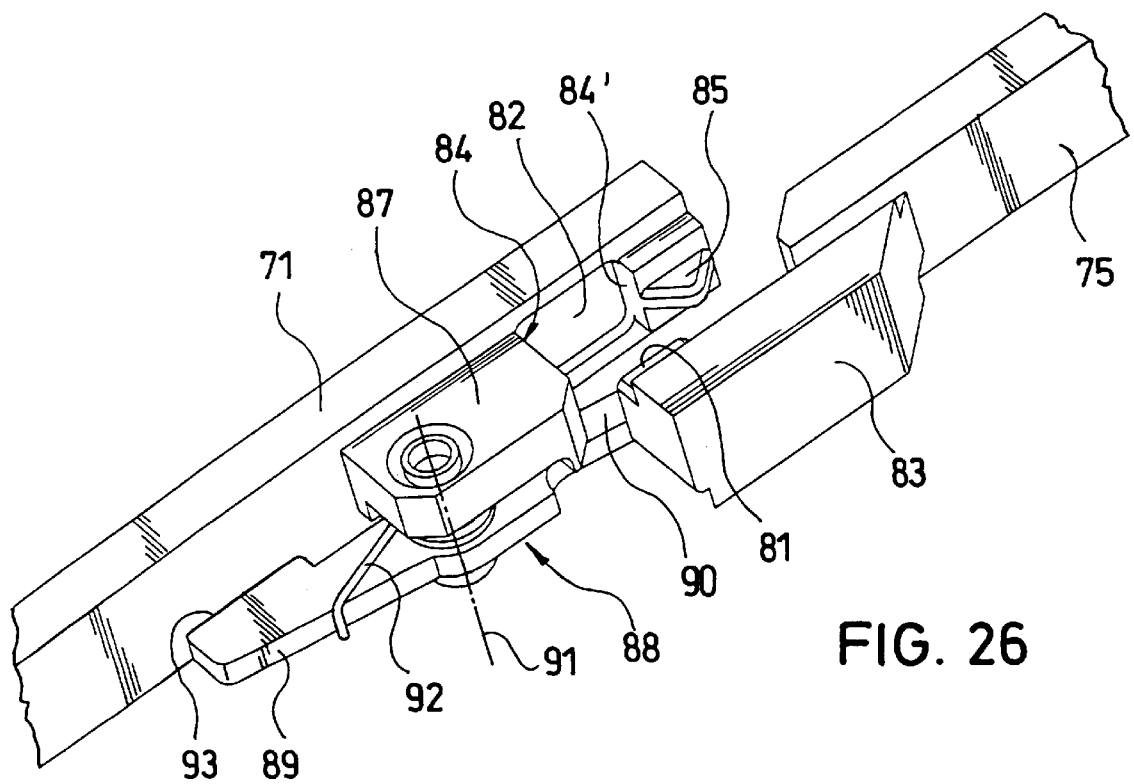

A drive carriage 40 which is movably supported on the guide rail 10 (see, for example, FIGS. 6 & 7) and which is connected to a drive cable 41 (see FIG. 24) which can be driven by a drive motor and which runs along the guide rail 10, and is also called a cable tether, is connected via a coupling means to the carriage 17 which supports the roof peak 12. The coupling means is formed in this embodiment as a toggle lever unit and contains a front and a rear toggle lever 42 and 43 which are movably accommodated within the guide rail 10. The front and the rear toggle levers 42 and 43 are, on the one hand, supported to be able to pivot around the respective transverse axes by means of a bearing pin 44, 45 on the carriage part 46 of the carriage 17 or on the drive carriage part 47 of the drive carriage 40, and they are connected, on the other hand, to be able to pivot around a center pivot axis 48 relative to one another. The pivot axis 48 is formed by a guide pin 49 which projects from the toggle levers 42, 43 laterally on the side of the toggle levers 42, 43 which is opposite the drive carriage part 47 and is movably held with a roller 50 supported on it in a guideway 51 of the guide rail 10 (see FIG. 9). The bearing pin 45 of the rear toggle lever 43 is held in a transverse groove 52 which is made in the drive carriage part 47 and which runs perpendicular to the guide rail 10 and extends laterally likewise into the guideway 51.

Figure 8:
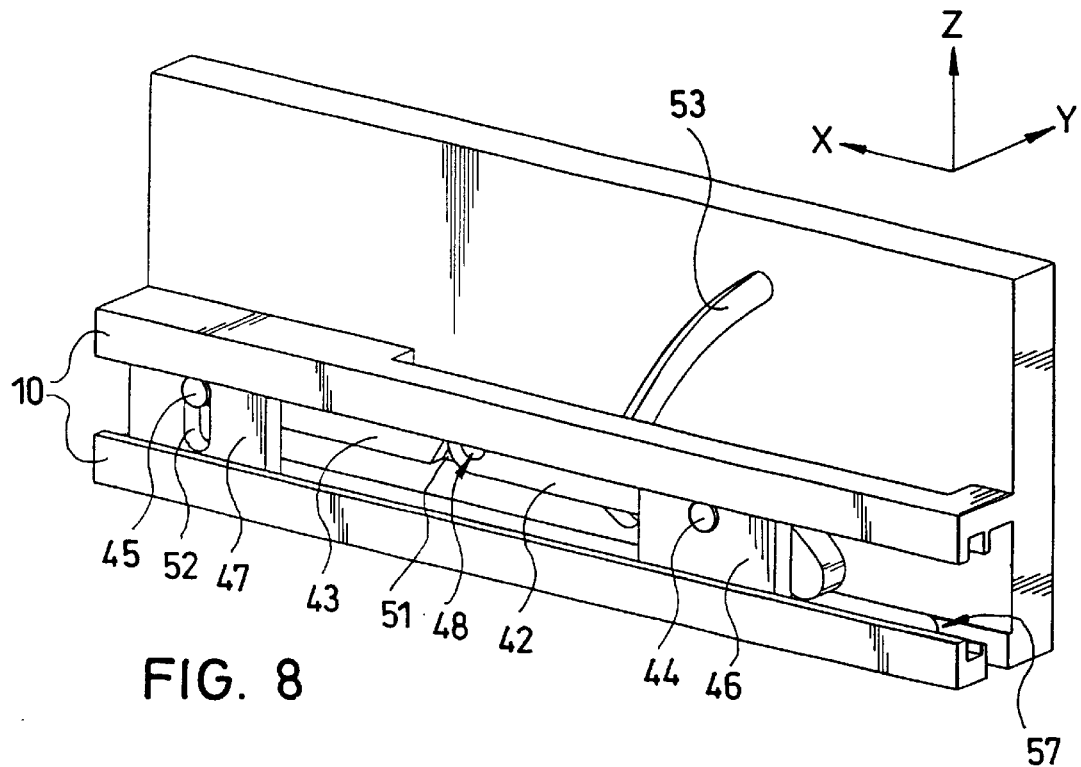
FIG. 8 is a perspective view, in simplified form, of a toggle lever coupling and top tensioning means in the open position of the folding top of the motor vehicle.
Figure 11:
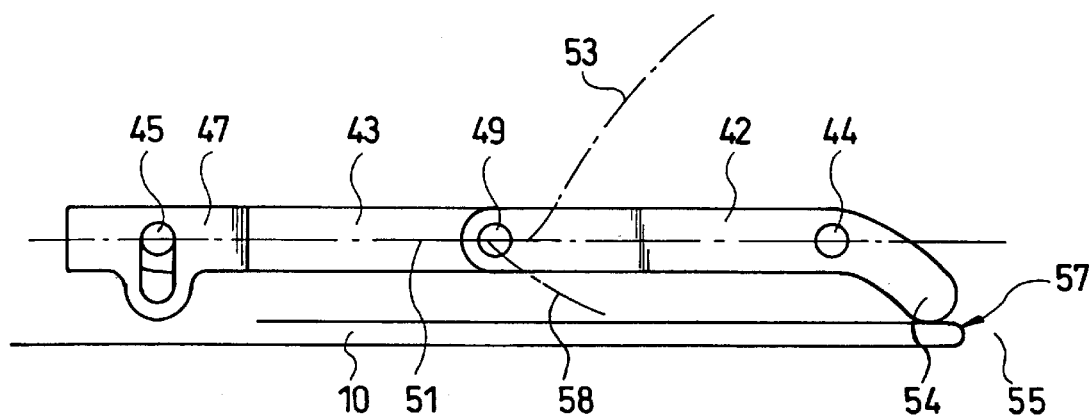
FIG. 11 is a schematic side view of the toggle lever coupling and top tensioning means in the same position of motion as shown in FIG. 10.
Figure 12:
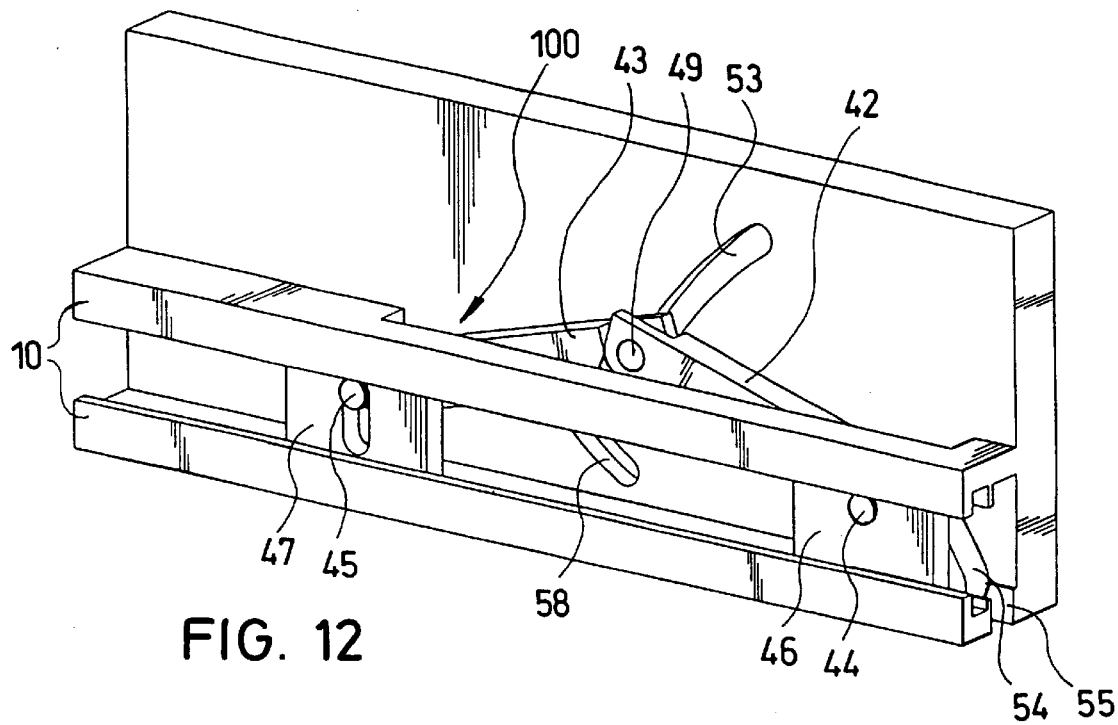
FIG. 12 is a view corresponding to that of FIG. 10, but with the toggle lever coupling and top tensioning means in another position of motion.
Figure 13:
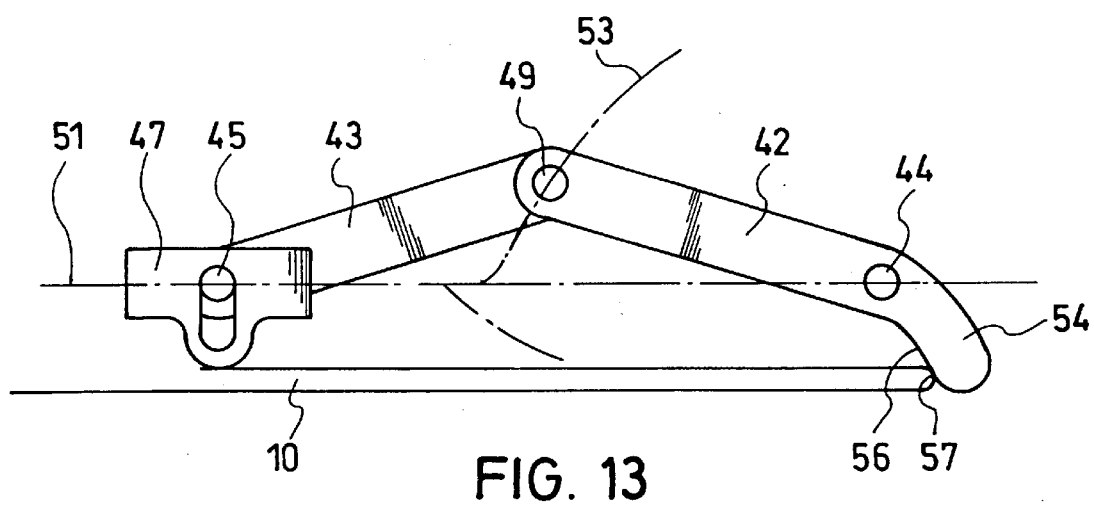
FIG. 13 is a schematic side view of the toggle lever coupling and top tensioning means in the position of motion shown in FIG. 12.

Over almost the entire displacement range of the roof peak 12 of the folding roof 1 the coupling means assumes the position shown in FIG. 8 in which the two toggle levers 42, 43 are kept aligned linearly relative to one another and parallel to the guide rail 10 so that there is rigid coupling with fixed relative assignment between the drive carriage 40 and the carriage 17 of the roof peak 12, and the drive motion of the drive carriage 40, 47 is transferred unchanged to the carriage 17, 46. When, in the course of closing of the folding roof 1, the rigidly coupled carriage 17 has reached a position in which the roof peak 12 is located directly in front of its closed position (see FIG. 9 and 11) and the front edge 28 has either already touched the apron seal 29 or is a short distance in front of it, in the subsequent displacement of the drive carriage 40, 47, the guide pin 49 with its roller 50 follows a deflection curve segment 53 of the guideway 51, which segment runs obliquely upward, so that the two toggle levers 42, 43 pivot around their bearing pins 44, 45 and assume a mutual angular position on the guide pin 49 (see FIG. 12 and 13). At the same time, a front retaining projection 54 which is formed on the front toggle lever 42 is swung into a lower opening 55 on the guide rail 10, the retaining projection 54 being curved such that the inner slide surface 56 of the retaining projection 54 adjoins, in sliding contact, the rounded slide edge 57 of the guide rail 10, which edge forms an abutment. The rigid coupling is canceled by the toggle levers 42, 43 which pivot out and which extend through a recess 100 on the top of the guide rail 10 (see FIG. 12). According to the curvature and the tilt of the deflection curve segment 53 relative to the guide rail 10, the speed of the motion between the drive carriage 40 and the carriage 17 is thus stepped down so that they move relative to one another and the drive carriage part 47 approaches the carriage part 46. Continued slowed motion of the carriage 17 takes place by the front toggle lever 42 being supported via the retaining projection 54 on the slide edge 57 of the guide rail 10 (see FIGS. 12 and 13).

Figure 14:
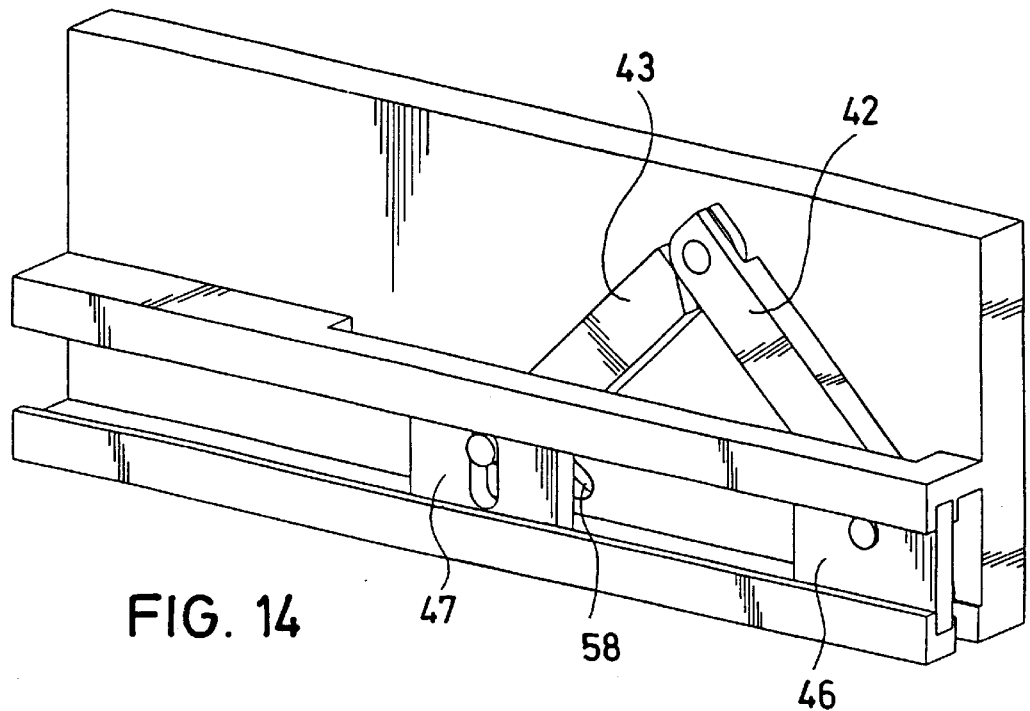
FIG. 14 is a view corresponding to that of FIG. 12, with the toggle lever coupling and top tensioning means in another position of motion.
Figure 15:
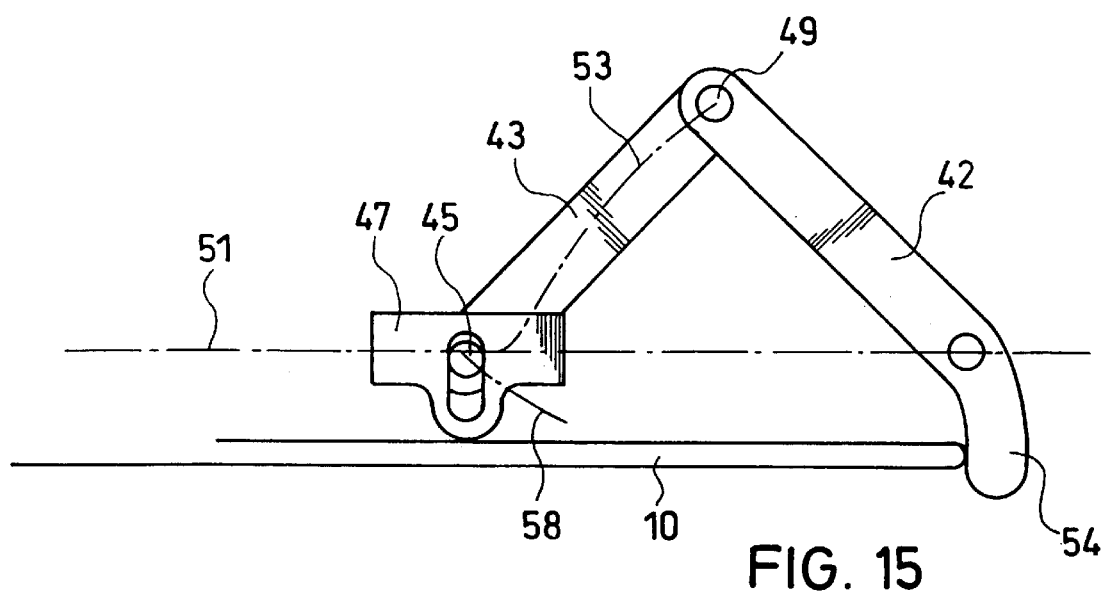
FIG. 15 is a schematic side view of the toggle lever coupling and top tensioning means in the position of motion shown in FIG. 14.

As a result of the lever ratio on the front toggle lever 42, which is determined, on the one hand, by the distance between the bearing pin 44 and the guide pin 49, and on the other hand, by the distance between the bearing pin 44 and the location of the sliding contact between the retaining projection 54 and the slide edge 57, the force is converted which is transmitted via the drive cable to the drive carriage 40, 47 and from the drive carriage 40, 47 to the carriage 17, 46, and this force presses the front edge 28 of the roof peak 12 on the last closing path into the seal 29 onto the apron 8. In the closed position of the roof peak 12, the carriage 17 has reached its front end position with the pivot position of the front toggle lever 42 shown in FIGS. 14 & 15 and with engagement of the retaining projection 54 in the opening 55 (see also FIG. 2), while the drive carriage part 47 assumes a position in which the bearing journal 45 of the rear toggle lever 43 is at the start of a lower deflection guide 58 which extends downward from the linear guideway 51 in the shape of a circular path, the imaginary center point of the guideway 51 lying at the current position of the guide pin 49 (see FIG. 15).

Figure 17:
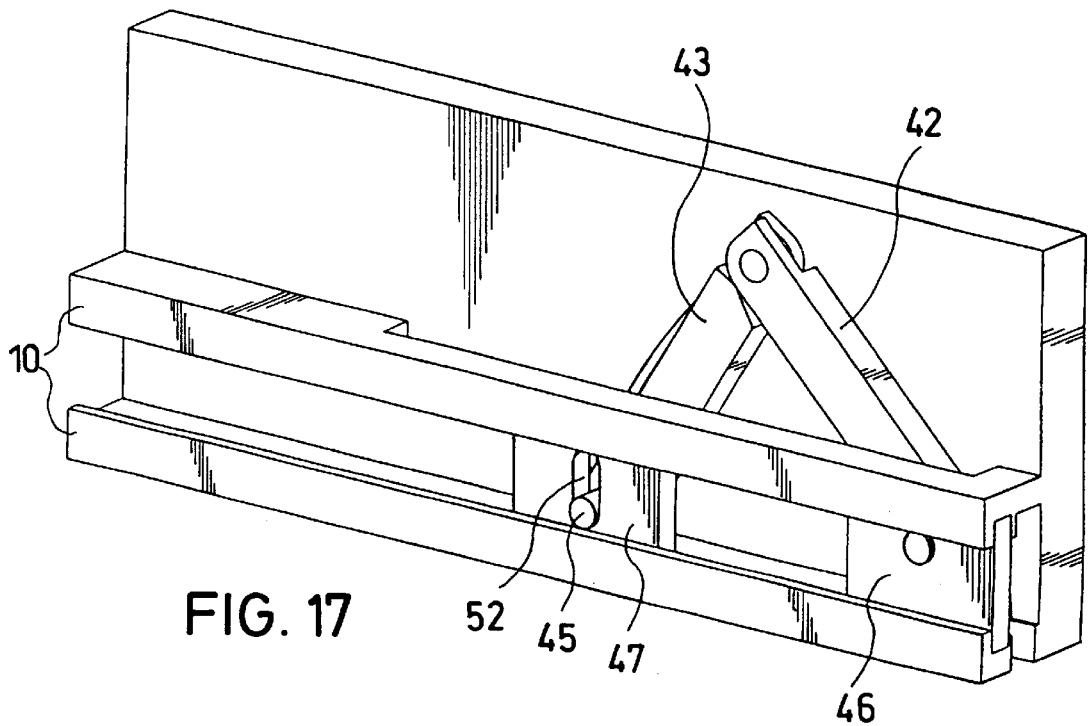
FIG. 17 is a view corresponding to that of FIG. 14, but with the toggle lever coupling and top tensioning means in the front end position.
Figure 18:
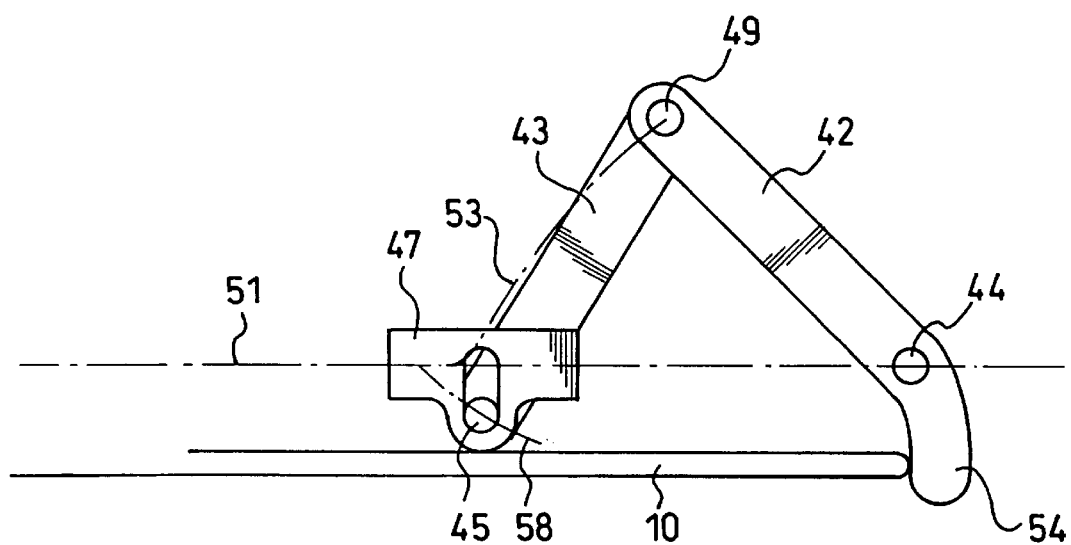
FIG. 18 is a schematic side view of the toggle lever coupling and top tensioning means in the front end position shown in FIG. 17.

If the drive carriage 40, 47 in the closed position of the roof peak 12 and of the carriage 17, 46 has continued to move by a certain amount, the bearing pin 45 enters the lower deflection guide 58, the rear toggle lever 43 being pivoted around the stationary guide pin 49. In the transverse groove 52, the bearing pin 45 can execute a compensation motion which is necessary relative to the drive carriage part 47. The forward end position of the motion of the drive carriage part 47 is shown in FIGS. 17 & 18.

The described toggle lever unit thus forms a top tensioning means which is independent of the movement mechanism of the roof peak and which, as a result of the force transmission, manages with the drive force made available for simple displacement of the roof peak 12 along the guide rail 10.

The length of the deflection guide 58 is fixed such that, when the roof peak 12 is closed on the two side roof rails 2, a certain mutual offset of the two simultaneously driven drive cables or a slanted position of the roof peak 12 relative to the transverse axis of the vehicle can be equalized. For example, if the roof peak 12 on its right side securely adjoins the apron 8 or the seal 29, while the left side is still a short distance away, on the left side roof rail 2, by the lengthwise motion of the drive carriage 40 the front toggle lever 42 is still pivoted to move the carriage 17, and on the right side roof rail 2, the simultaneous lengthwise motion of the drive carriage 40, 47 there is converted simply into swinging of the rear toggle lever 43 without motion of the carriage 17, 46, and thus, of this side of the roof peak 12.

Figure 16:
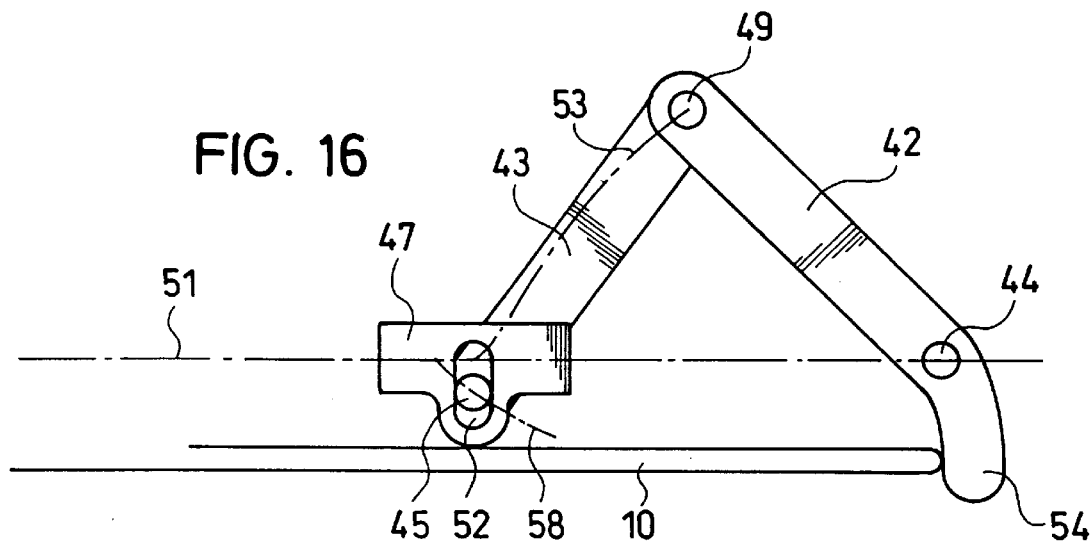
FIG. 16 is a schematic side view of the toggle lever coupling and top tensioning means in another position of motion.

In the closed position of the roof peak 12 in which the bearing journal 45 of the rear toggle lever 43 is held in the arc-shaped deflection guide 58 (see FIGS. 16 to 18), the carriage 17, and thus, the roof peak 12 are held locked against the forces which are acting on the roof peak 12, which are caused, for example, by the airstream, and which tend to push the carriage 17 to the rear into the open position. The back end of the front toggle lever 42 is held in its locking position via the rear toggle lever 43 which is supported on the bearing pin 45 perpendicularly on the arc-shaped deflection guide 58 and cannot yield laterally due to the force applied to it. Thus, the drive cable 41 and the drive motor are relieved.

To open the roof peak 12, the drive carriage 40, 47 is moved to the rear so that the bearing pin 45 from the arc-shaped deflection guide 58 moves into the linear guideway 51, by which interlocking is canceled.

Figure 19:
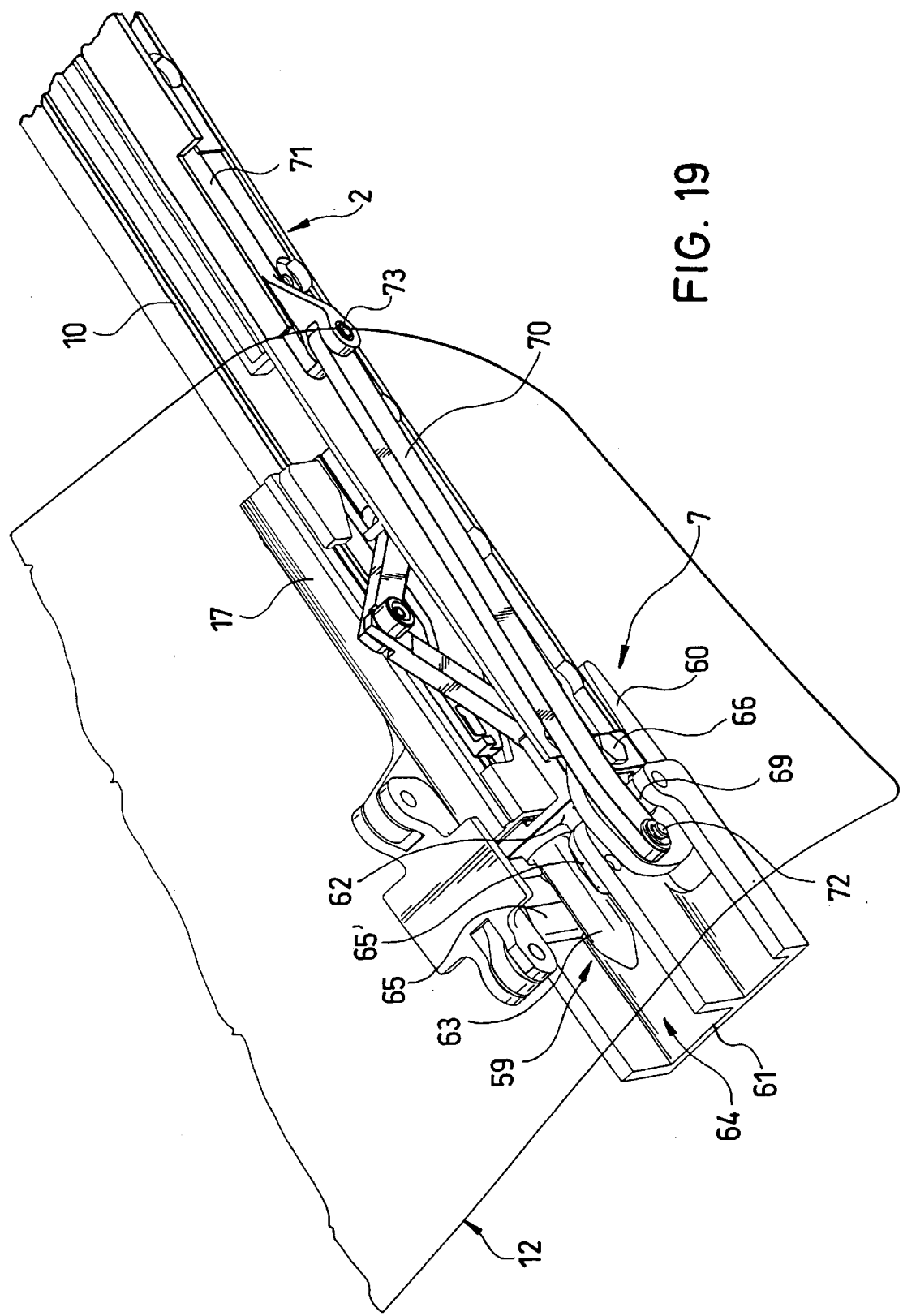
FIG. 19 is a perspective view from above of the front end of the side roof rail which is coupled to an apron.

Each side roof rail 2, on its front end 7, can be fixed by means of a side rail centering means 59 and the locking hook 60 of the locking means 9 on the apron bearing 61 (see FIG. 19). The side rail centering means 59 contains a centering pin 63 which projects on the end face 62 of the side roof rail 2 in the lengthwise direction and which is inserted into a centering bearing when the side rail 50 is coupled. The centering bearing in the receiving space 64 of the apron bearing 61 has two support parts 65, 65' which are laterally opposite one another, which are spaced apart from one another, and which have sides which project opposite one another and are arched such that essentially vertical contact lines are formed on which the centering pin 63 is held centered on its opposite sides in the transverse direction in spot contact on the support parts 65, 65'.

Figure 20:
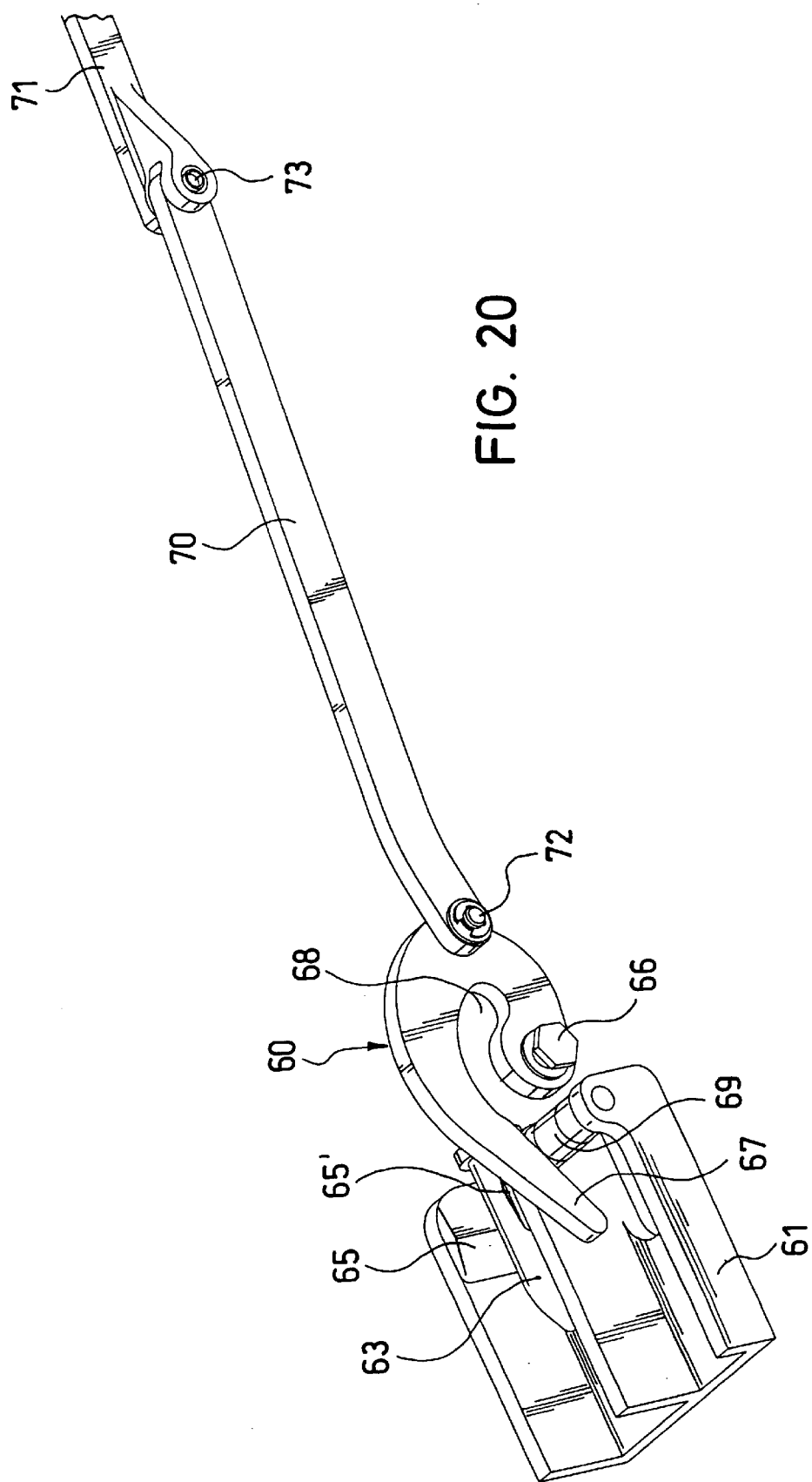
FIG. 20 is a perspective view from above of a locking means and a centering means on the front end of the side roof rail.
Figure 21:
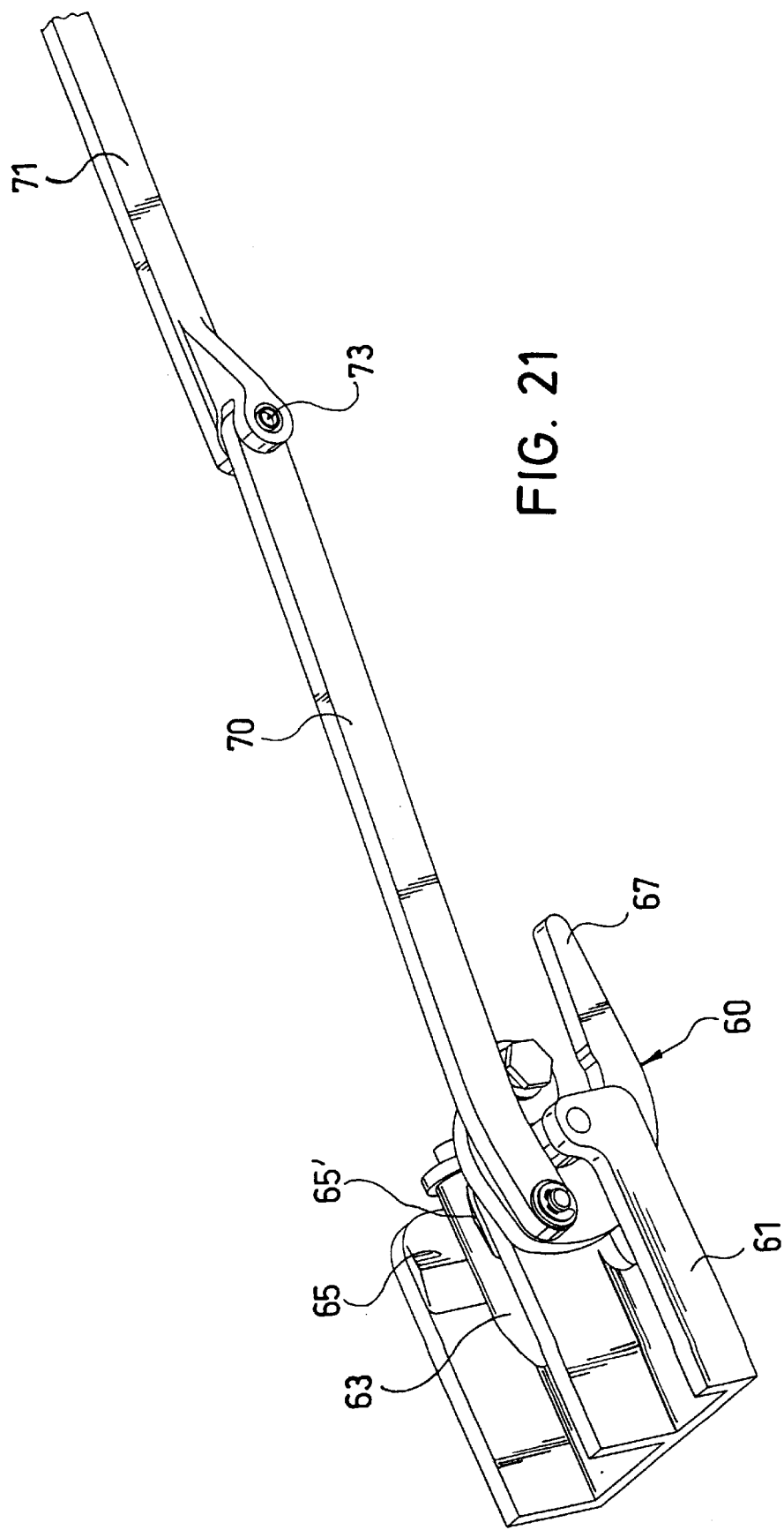
FIG. 21 is a view corresponding to that of FIG. 20, but with the locking means in the closed position.

The locking hook 60, which is attached to be able to pivot on the axis 66 of rotation on the front end of the side roof rail 2 around the transverse axis, has an elongated lock hook 67 and a subsequent curved lock receiver 68 for engaging a transverse bearing pin 69 which is attached to the apron bearing 61. The side roof rail 2 is guided with the locking hook 60 opened (see FIG. 20) onto the apron bearing 61 until the centering pin 63 is held centered on the support parts 65, 65' and the locking hook 60 is located over the transverse bearing pin 69. By means of a coupling rod 70, which is supported to be able to swivel in the respective axes 72 and 73 of rotation on the locking hook 60 and on the drive rod 71 which is movably supported on the side roof rail 2 in the guideway of the guide rail 10, the locking hook 60 is pivoted downward around its axis 66 of rotation by the lengthwise displacement of the drive rod 71, the transverse bearing pin 69 being inserted into the lock receiver 68 and being held locked therein (see FIGS. 19 & 21).

The drive rod 71, which is supported to be able to move lengthwise on the pivoting side roof rail 2, is coupled via a coupling means 74 to a rear drive rod 75 which is movably supported on the rear guide rail section 14 of the roof cassette 6 for transfer of motion when the side roof rail 2 is pivoted forward (see, for example, FIGS. 1a & 1b), and separably when the side roof rail 2 is released again from the apron 8 and is pivoted in onto the roof cassette 6 (see FIG. 1c).

Figure 22:
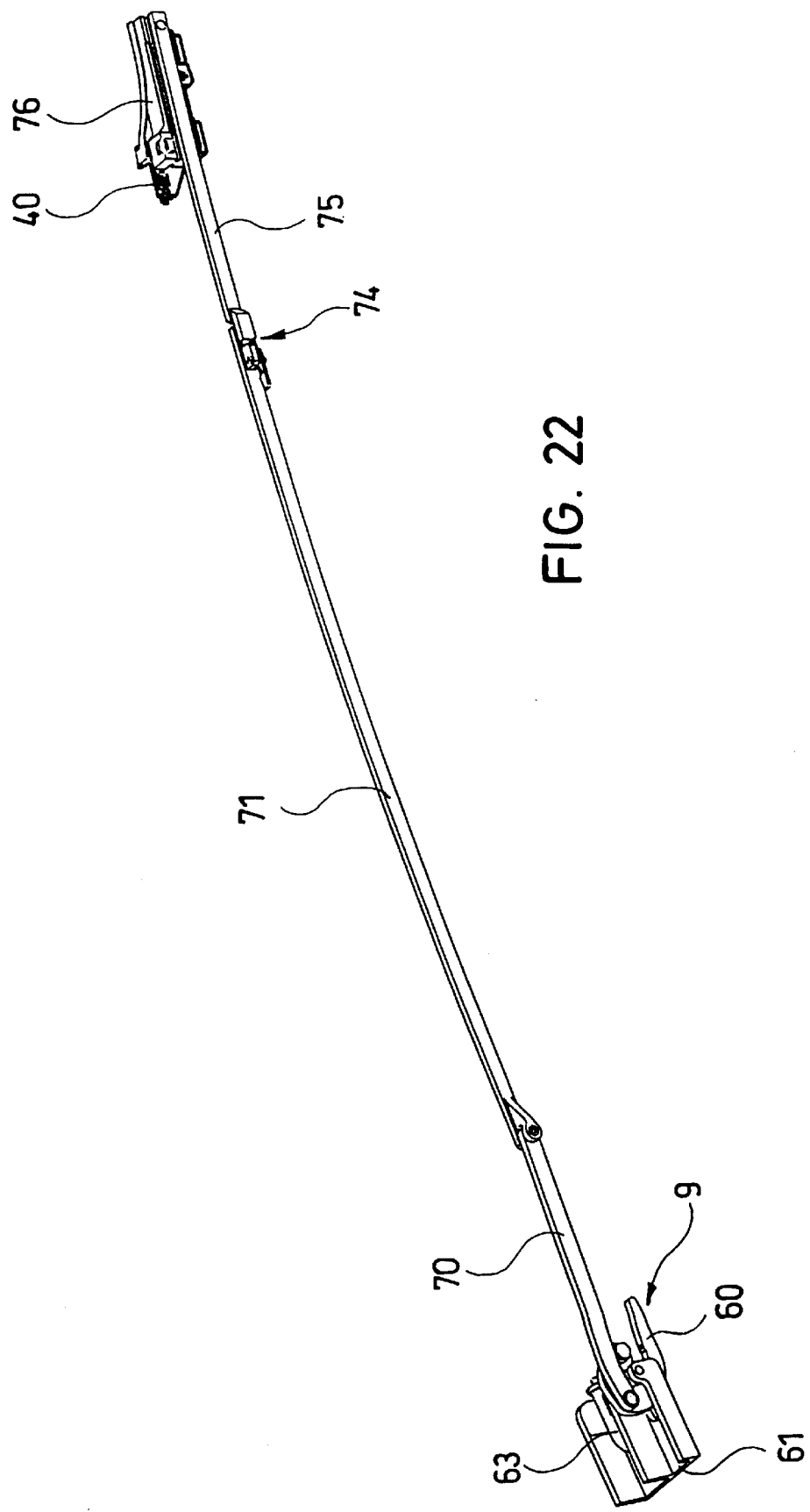
FIG. 22 is a perspective view from above of the locking means with drive elements.
Figure 23:
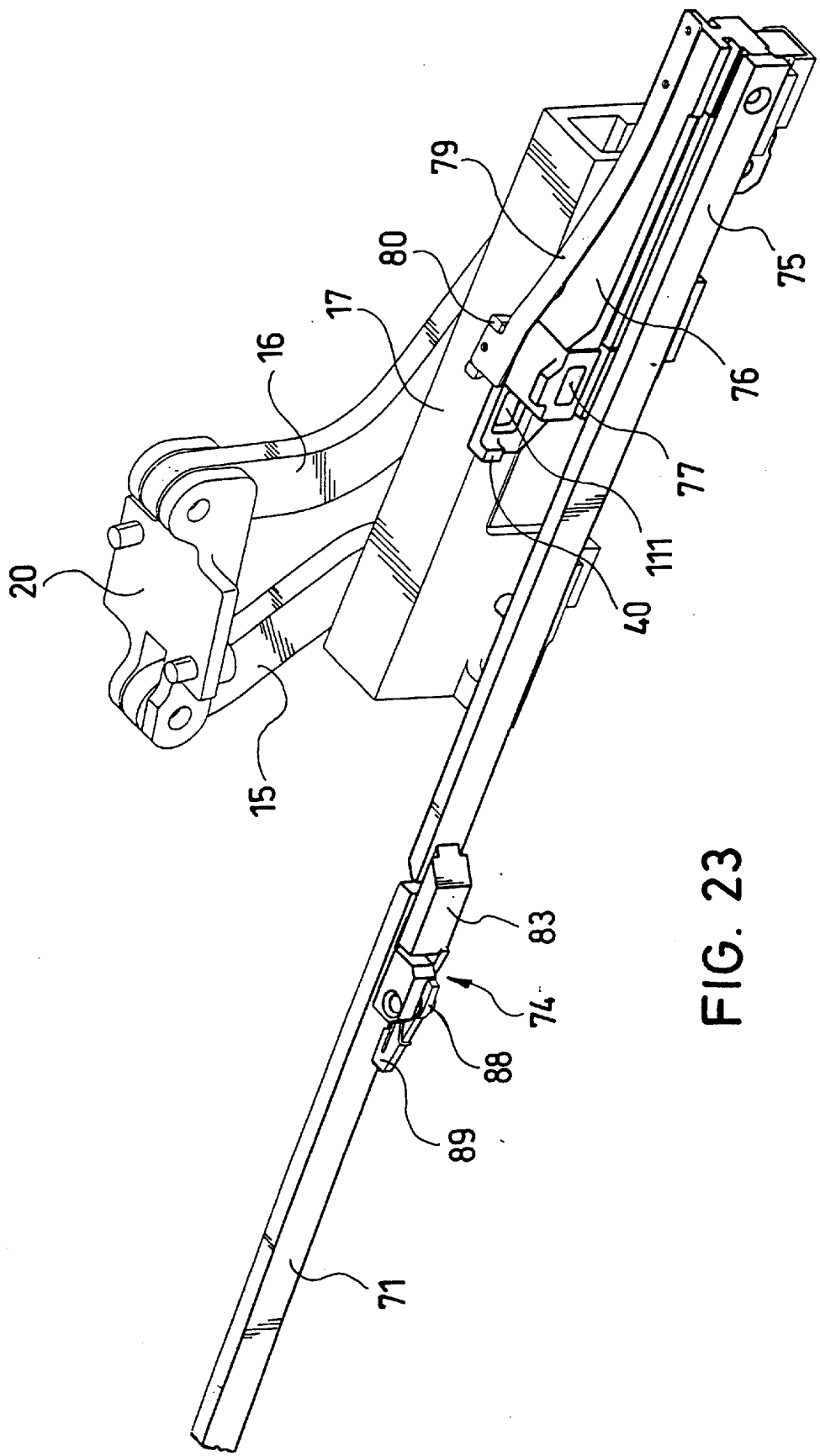
FIG. 23 is a perspective view from above of the rear section of the locking means with a coupling means for a front and a rear drive rod and with a drive section.
Figure 33:
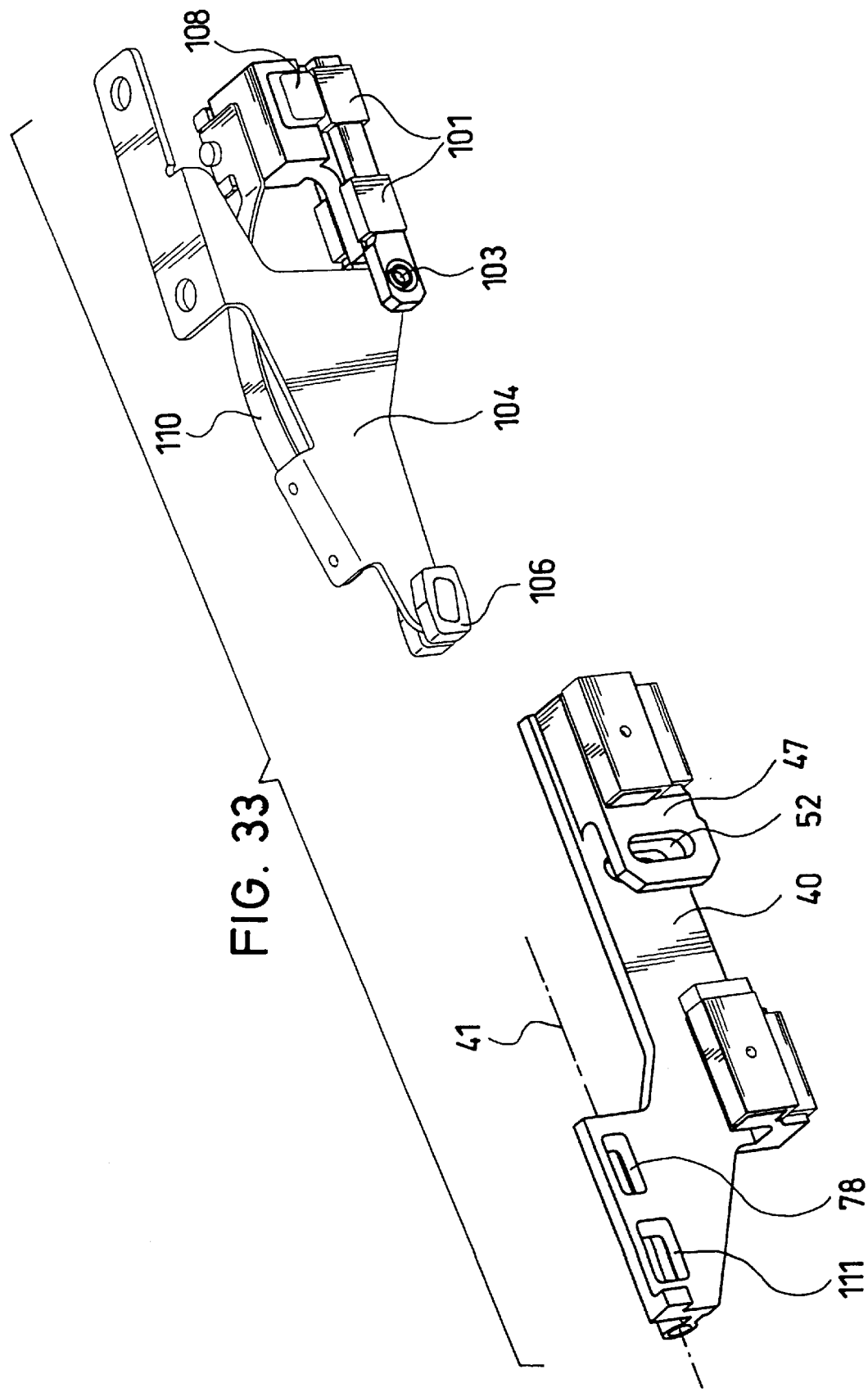
FIG. 33 is a perspective view of a drive part and the bearing means of the intermediate bow.

Driving of the rear drive rod 75, and thus of the locking hook 60 via the coupling to the front drive rod 71 and the coupling rod 70, takes place via the drive carriage 40 which is pulled by the drive cable, and together with the roof peak 12 and the intermediate bow 13, is moved along the guide rail 10 to the rear as far as to the rear guide rail section 14 on the roof cassette 6 (see FIGS. 22 & 23, in which the guide rails are not shown). A driver 76 is attached to the rear drive rod 75 and is coupled to the drive carriage 40 which is moved to the rear and next to the drive 76, for example, by a spring-loaded lever, or by a locking block 77 (see FIGS. 23 & 24), which is movably held in the driver 76 perpendicular to the displacement direction of the drive carriage 40 or to the guide rail 10 and fits into an assigned recess 78 in the drive carriage 40 (see FIGS. 33 & 34) and locks, when the recess is aligned to the locking block 77. The locking block pair 80, which is attached elastically to the driver 76 via a leaf spring 79, is pivoted by the drive carriage 40 to disengage from the locking block 77. The drive cable displaces the drive carriage 40 further to the rear, which in turn pushes the rear drive rod 75 via its coupling to the driver 76 and via the described coupling pivots the locking hook 60 into its unlocked position. The drive carriage 40 is stopped in this position. The side roof rail 2 is then pivoted in via a separate drive, the front drive rod 71 de-coupling from the rear drive rod 75 on the coupling means.

The coupling means 74 has a coupling journal 81 which is located on the rear drive rod 75 (see FIGS. 25–28) and which is intended for coupled capture and transfer of tensile and compressive forces into a coupling groove 82 which is made on the front drive rod 71. The coupling journal 81 projects laterally against the end section of the front drive rod 71 on a shoulder 83 which is outside relative to the side roof rail 2 and which extends beyond the end of the rear drive rod 75. The coupling groove 82 contains two groove boundaries 84, 84' which are spaced apart in the lengthwise direction, between which the coupling journal 81 is held and against which it can lie. The mutual distance of the two groove boundaries 84, 84' is greater than the length of the coupling journal 81 in this direction and the positional assignment of the groove boundaries 84, 84' to the coupling journal 81 is such that the coupling journal 81 is held in the coupling groove 82 with play to equalize the component tolerances and changes in length of the components as a result of the effects of thermal expansion.

On the front end of the front drive rod 71, there is a centering projection 85 which projects against the lateral shoulder 83 of the rear drive rod 75 and fits into an assigned centering recess 86 which is matched to the centering projection 85 and which is formed on the lateral shoulder 83 between the coupling journal 81 and the rear drive rod 75.

On the rear section of the front drive rod 71, there is a laterally projecting bearing bracket 87, on which a double-sided blocking lever 88 with two opposing lever arms which form one locking arm 89 and one release arm 90 is supported around the pivoting axis 91, which lies between the locking arm 89 and the release arm 90 and is pretensioned with a spring 92 so that the locking arm 89, which has the locking projection 93, is pressed against the guide rail 10, which extends around the drive rod 71, and when the drive rod 71 is displaced, the guide rail 10 can slide along on the drive rod 71. The guide rail 10 has a recess 94 (see FIG. 27 & 29) into which the locking projection 93 of the blocking lever 88 or the locking arm 89 can fit so that the pivoted blocking lever 88 keeps the front drive rod 71 blocked against displacement on the side roof rail 2.

Figure 27:
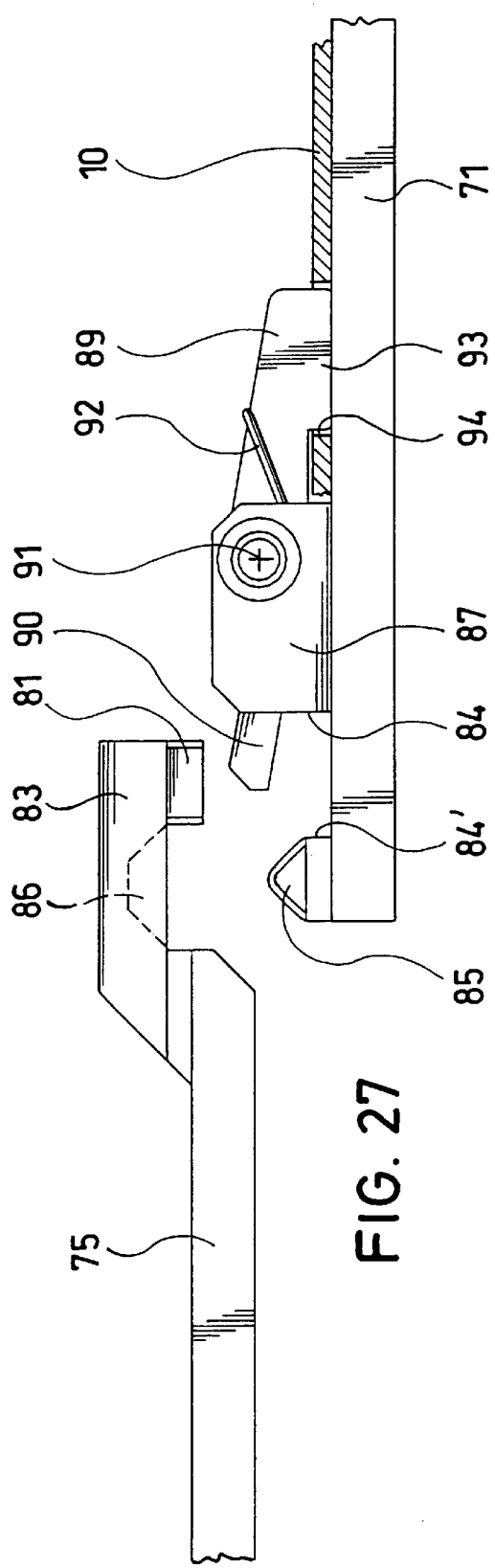
Figure 28:
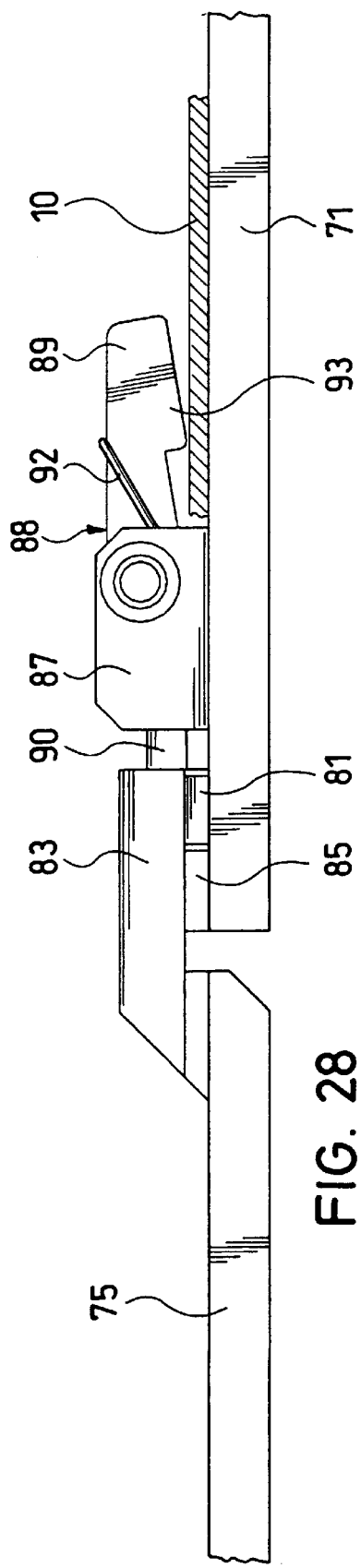
FIG. 28 is a top view as shown in FIG. 27, but with the coupling means coupled.

FIG. 27 shows the de-coupled position in which the front side roof rail (not shown) is located by a small swivel angle in front of the coupled position (see FIG. 28; but in FIG. 27, in a simplified representation, the front and the rear drive rod 71 and 75 being shown in an arrangement parallel to one another). When coupling out of this slightly pivoted position during the last pivoting path of the side roof rail 2, which moves the front drive rod 71 into the pivoted-out position as shown in FIG. 28, in which it is located in the straight extension of the rear drive rod 75, an actuating projection 95 which is formed on the lateral shoulder 83 of the front drive rod 71 presses against the release arm 90 of the blocking lever 88 and swings it against the spring force, by which the locking arm 89 with its locking projection 93 is pushed out of the recess 94 so that blocking is canceled, and consequently, displacement of the front drive rod 71 along the side roof rail 2 is possible and causes closing of the locking hook 60 on the apron 8.

Figure 29:
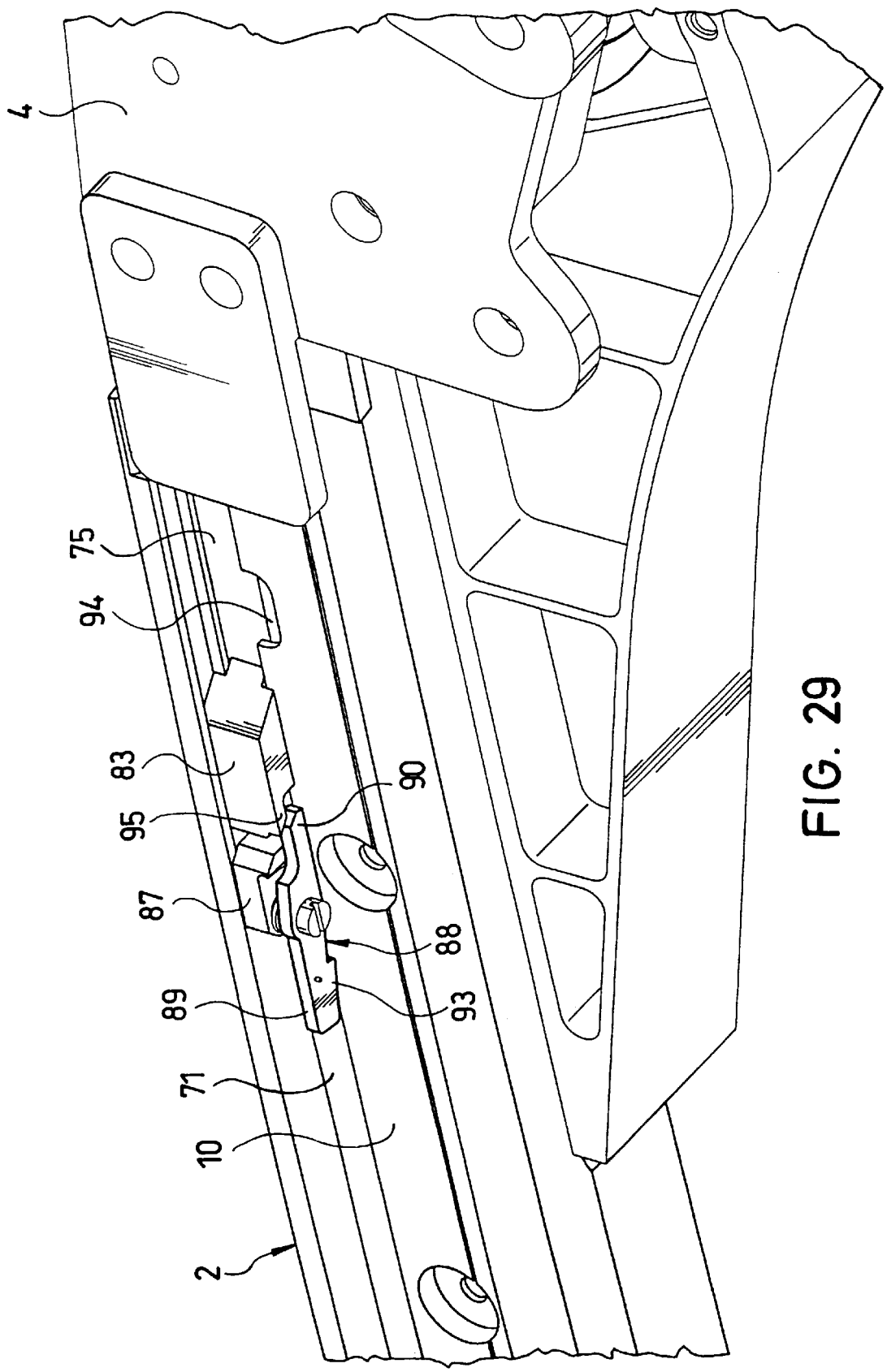
FIG. 29 is a perspective view showing the side roof rail with the coupling means of the drive rods.
Figure 30:
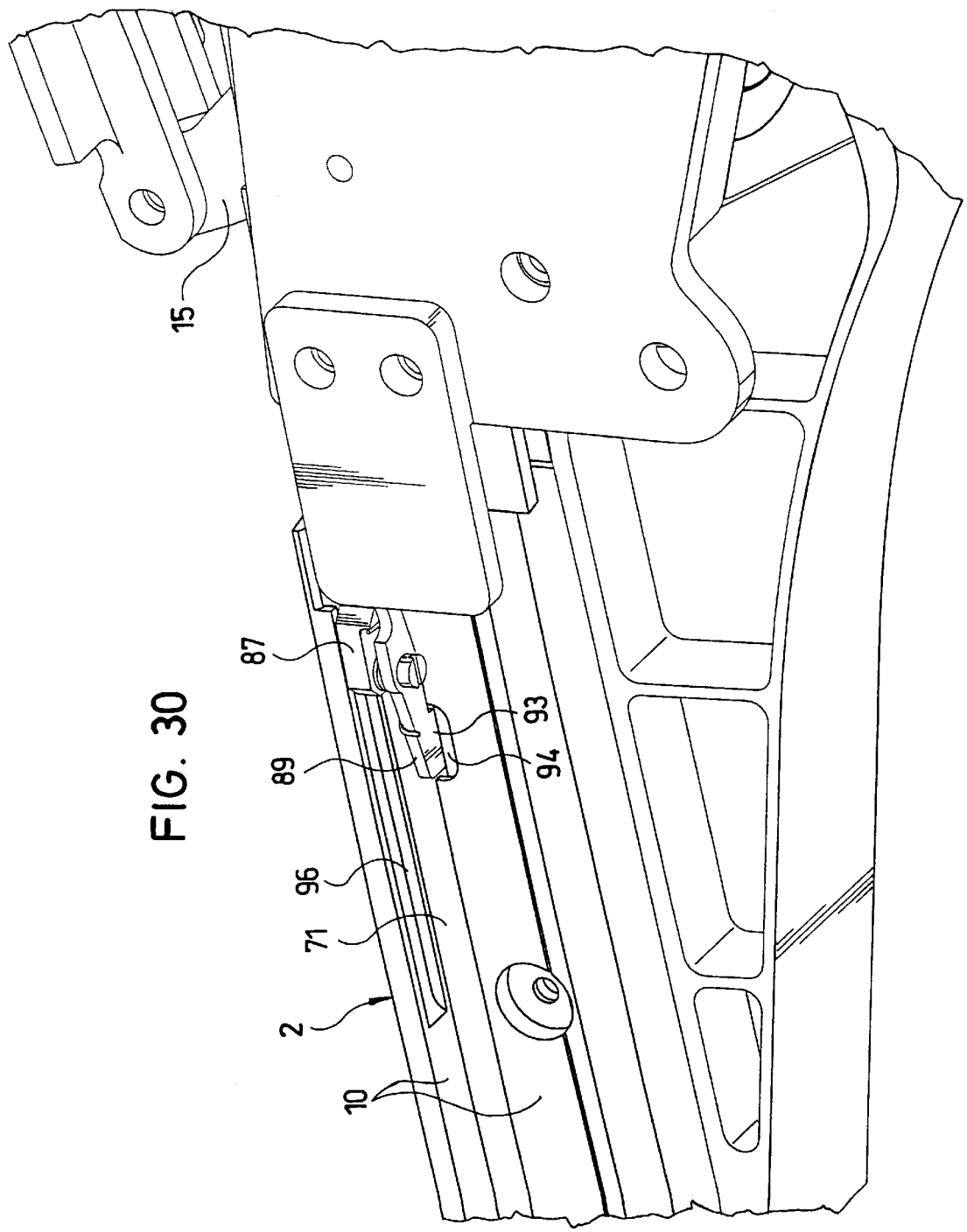
FIG. 30 is a perspective view as in FIG. 29, but with the coupling means and the drive rods in an altered position.

FIGS. 29 & 30 show the two end positions of displacement of the front and the rear drive rod 71 and 75 relative to the guide rail 10 on the front side roof rail 2. In FIG. 29, the bearing bracket 87 and the lateral shoulder 83, which are accommodated in the lengthwise groove 96 on the guide rail 10 and are movably held in the lengthwise direction, are in their coupled position in the front position which corresponds to a closed locking hook 60. When the returning drive carriage 40 has been coupled to the driver 76, it pulls the rear drive rod 40 to the rear until the coupling means 74 has reached the position shown in FIG. 30 in which the shoulder 83 has emerged from the lengthwise groove 96, the bearing bracket 87 is still located in the lengthwise groove 96 and the locking arm 89 with the locking projection 93 pivots into the recess 94 (as has already been shown) when the side roof rail 2 with the front drive rod 71 is pivoted inward in the direction to the roof cassette 6.

When the folding roof 1 is opened, the roof peak 12 is pushed by the moving drive carriage 40 to the rear towards the roof cassette 6 (see FIGS. 1 & 31 to 33). In doing so, the roof peak 12 is initially slanted on the first path of movement, as described above, by the front connecting rod 15 and the control lever 16 of the four-bar mechanism with the rear edge 97 raised, the front edge 28 being raised from the side sealing flange 99, and further displacement of the roof peak 12 being guaranteed, and at the same time, moved relative to the stationary intermediate bow 13.

Figure 31:
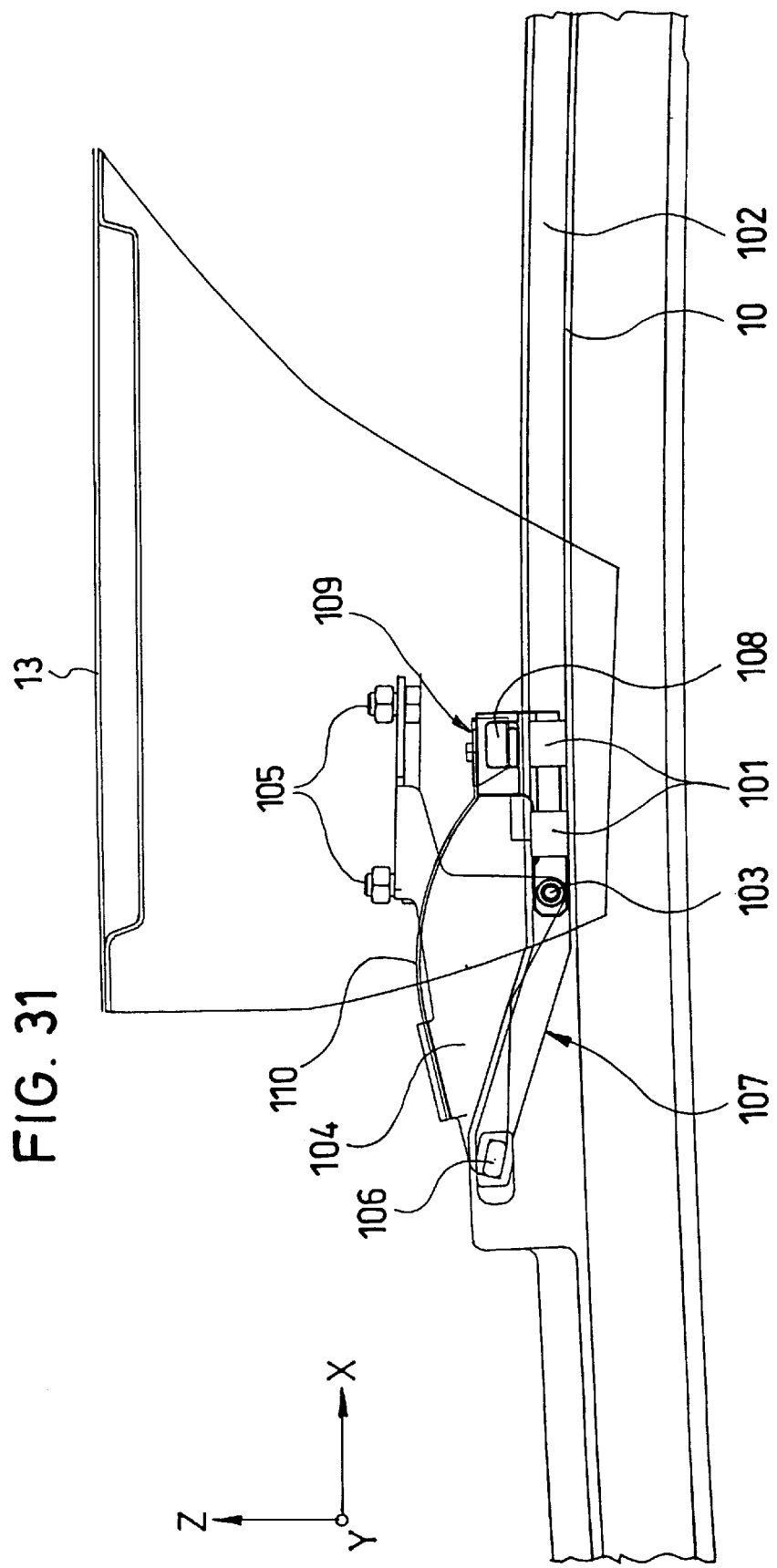
FIG. 31 is a schematic side view of an intermediate bow with its bearing means on the guide rail of the side roof rail.
Figure 32:
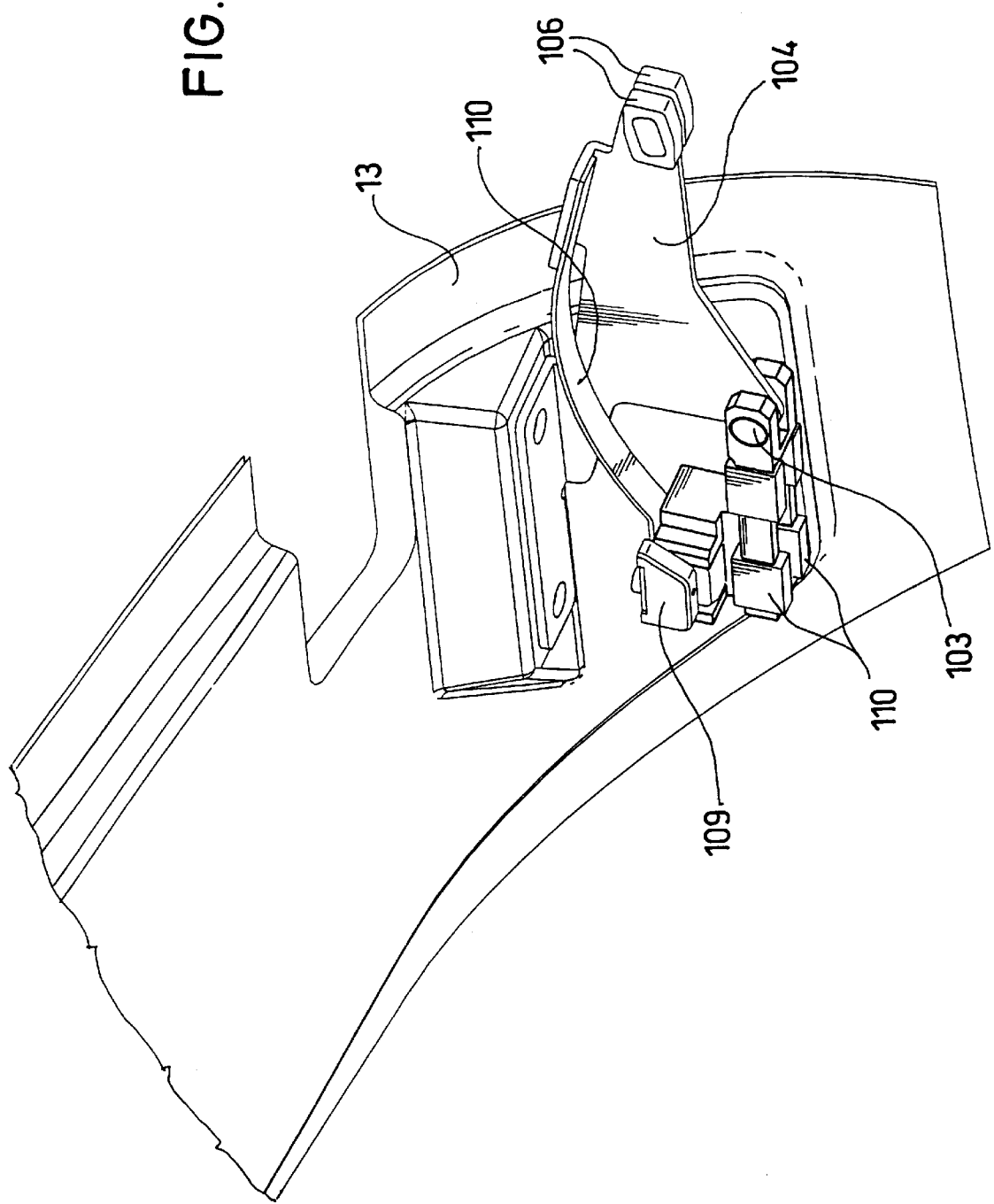
FIG. 32 is a schematic perspective view of an intermediate bow with its bearing means.

The intermediate bow 13 is movably supported via a respective intermediate bow bearing at each side roof rail 2 (see FIGS. 31 & 32). Each intermediate bow bearing contains a slide bearing 101 which is movable lengthwise in the guide path 102 of the guide rail 10. On the axis 103 of rotation which is located on the front end 102 of the slide bearing 101 in the transverse direction, an intermediate bow support 104 is pivotally mounted on which the intermediate bow 13, being attached, for example, by a screw joint 105. The intermediate bow support 105 contains a front control slide bearing 106 which, in the position of the intermediate bow 13 shown in FIG. 31, is movably held in the elevated front section of a deflection path 107 which lowers to the rear to the level of the guideway 102. In the position shown, the intermediate bow support 104 keeps the intermediate bow 13 in a position roughly parallel to the guide rail 10 or to the side roof rail 1.

The slide bearing 101 contains a locking means for fixing the slide bearing 101 in the position shown in FIG. 31. The locking means contains, for example, a locking block 108 which is movably guided in the transverse direction on the slide bearing 101, and in the lock position show in FIG. 31, is engaged by blocking in a lock recess (not shown) in the guide rail 10 so that the intermediate bow 13 is fixed against translational displacement on the guide rail 10.

A locking block catch contains a catch plate 109 which is attached to a leaf spring 10 which is mounted on the intermediate bow support 104 and is kept in contact by the spring with the inside or back or the locking block 108, which contact is opposite its engagement in the guide rail 10. The locking block 108 can be raised with elastic deformation of the leaf spring 110 out of this catch position so that the locking block 108 emerges from the lock recess in the guide rail 10 and the blocking engagement is canceled.

While the roof peak 12 is being moved against the intermediate bow 13, it is still fixed in the described manner on the guide rail. The convertible top fabric which is attached to the roof peak 12, the intermediate bow 13 and the main bow 5 is folded with translational Z-folding between the roof peak 12 and the intermediate bow 13 in controlled folding. The fixed intermediate bow 13 keeps the top material tensioned between the intermediate bow 13, and optionally, the next intermediate bow or the main bow 5, while different partially open positions of the folding roof 1 can be adjusted by moving the roof peak 12 into intermediate positions as far as the intermediate bow 13.

Figure 34:
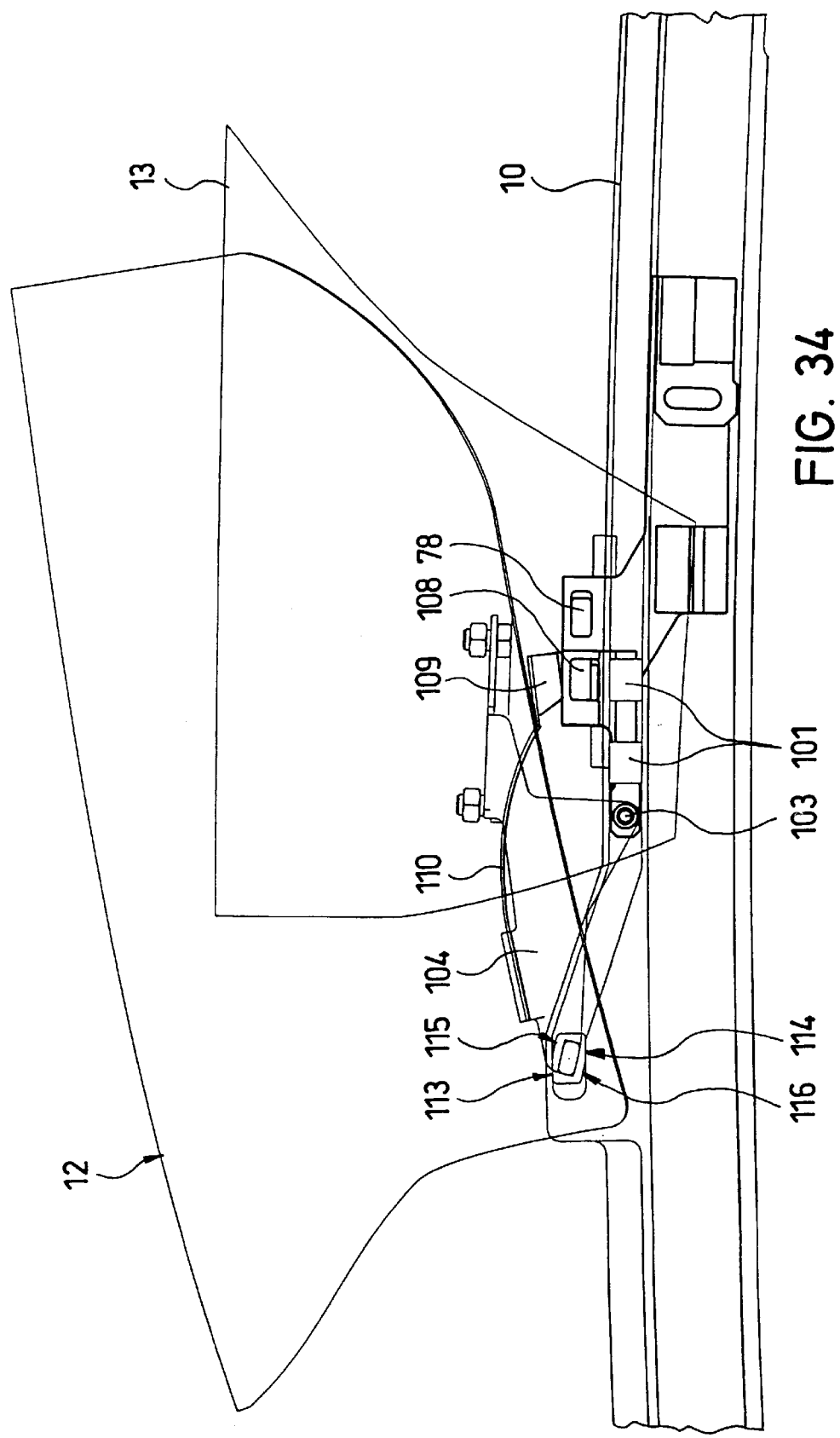
FIG. 34 is a side view corresponding to that of FIG. 31, but with the intermediate bow with the roof peak coupled.
Figure 35:
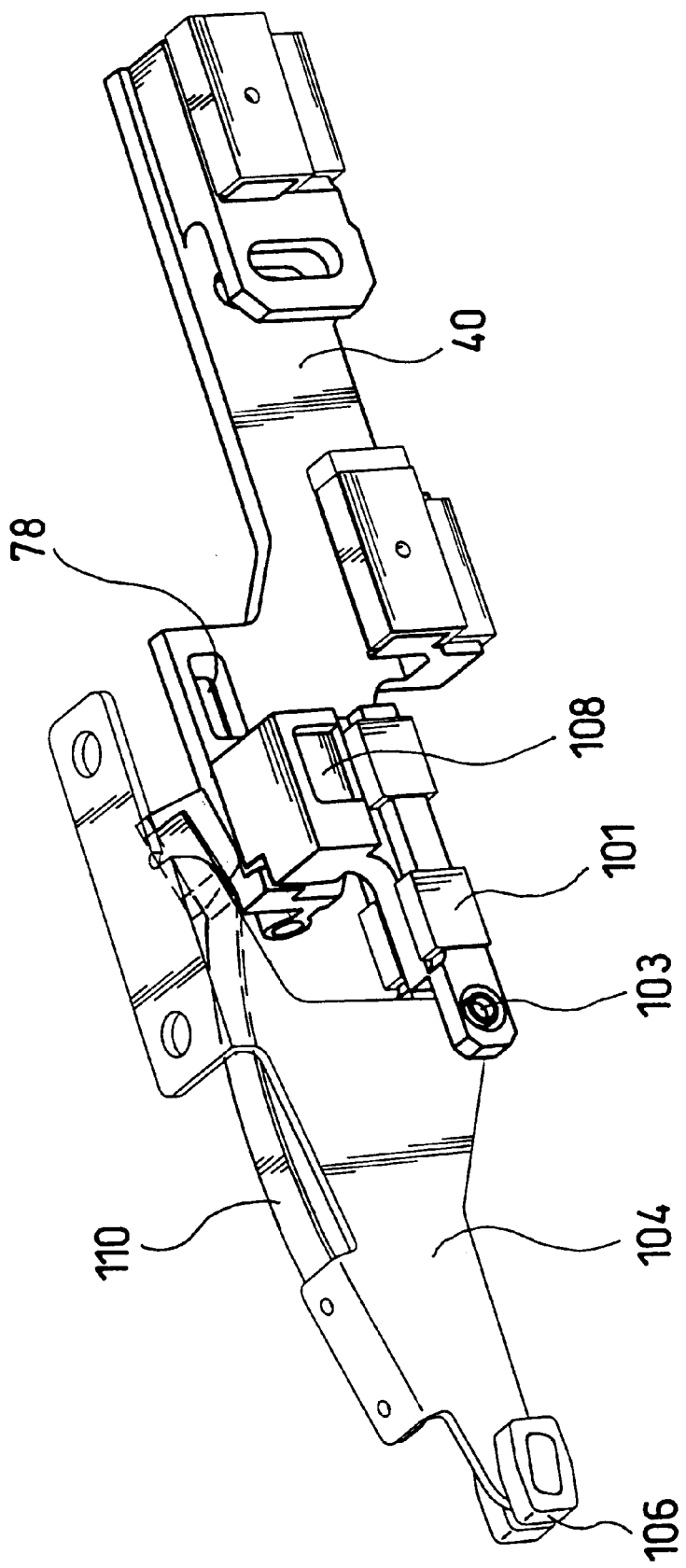
FIG. 35 is a perspective side view corresponding to that of FIG. 33, but with the drive part coupled to the bearing means of the intermediate bow.

As the folding roof 1 continues to open, the drive carriage 40, which is moved to the rear together with the coupled, tilted roof peak 12, moves into the position which is shown in FIG. 34 and in which the front locking block window 111 of the drive carriage 40 is located next to the locking block 108. The drive carriage 40, shortly before reaching the position shown in FIG. 34, has raised the catch plate 109 out of its catch position (see FIG. 31) against the force of the leaf spring 110, so that the locking block 108 has been moved out of the recess in the guide rail 10 and with its back fits into the locking block window 11 on the drive carriage 40 (see also FIG. 35). Thus, the fixing of the intermediate bow 13 on the guide rail 10 against translational displacement is canceled and coupling of the slide bearing 101 of the intermediate bow 13 to the drive carriage 40 has taken place.

The drive carriage 40, which continues to move, entrains the slide bearing 101 of the intermediate bow 13 and the intermediate bow support 104 out of the position shown in FIG. 34 to the rear against the roof cassette 6. In doing so, the control slide bearing 106 initially moves on a short path segment 112 of the deflection path 107, which is parallel to the guide rail 10 and in which it is supported flat and guided with its top 113 and its bottom 114, which are parallel to one another, on the corresponding boundaries of the path segment.

The control slide bearing 106 has a second top surface 115 and a second bottom surface 116 which are at an angle to the bordering top and bottom 113, 114 such that they flatly adjoin the sides of the path segment when the control slide bearing 106 enters the linearly falling deflection section 107. While the control slide bearing 106 is sliding down in the deflection path 107, the intermediate bow support 104 is pivoted so that the intermediate bow 13 is angle to match the inclination of the roof peak 12 (see FIG. 36). When the control slide bearing 106 has reached the lower horizontal guideway 102, the maximum pivoting swing of the intermediate bow support 104 is reached. As the drive carriage 40 and the slide bearing 101 continue to move, the second top surface 115 and the bottom surface 116 of the control slide bearing 106 remain superficially engaged by sliding support on the sides of the guideway 102. This superficial contact reduces the wear on the slide surfaces so that tilting adjustment of the intermediate bow 13 remains free of play and thus free of vibrations even after a longer period of use.

Figure 36:
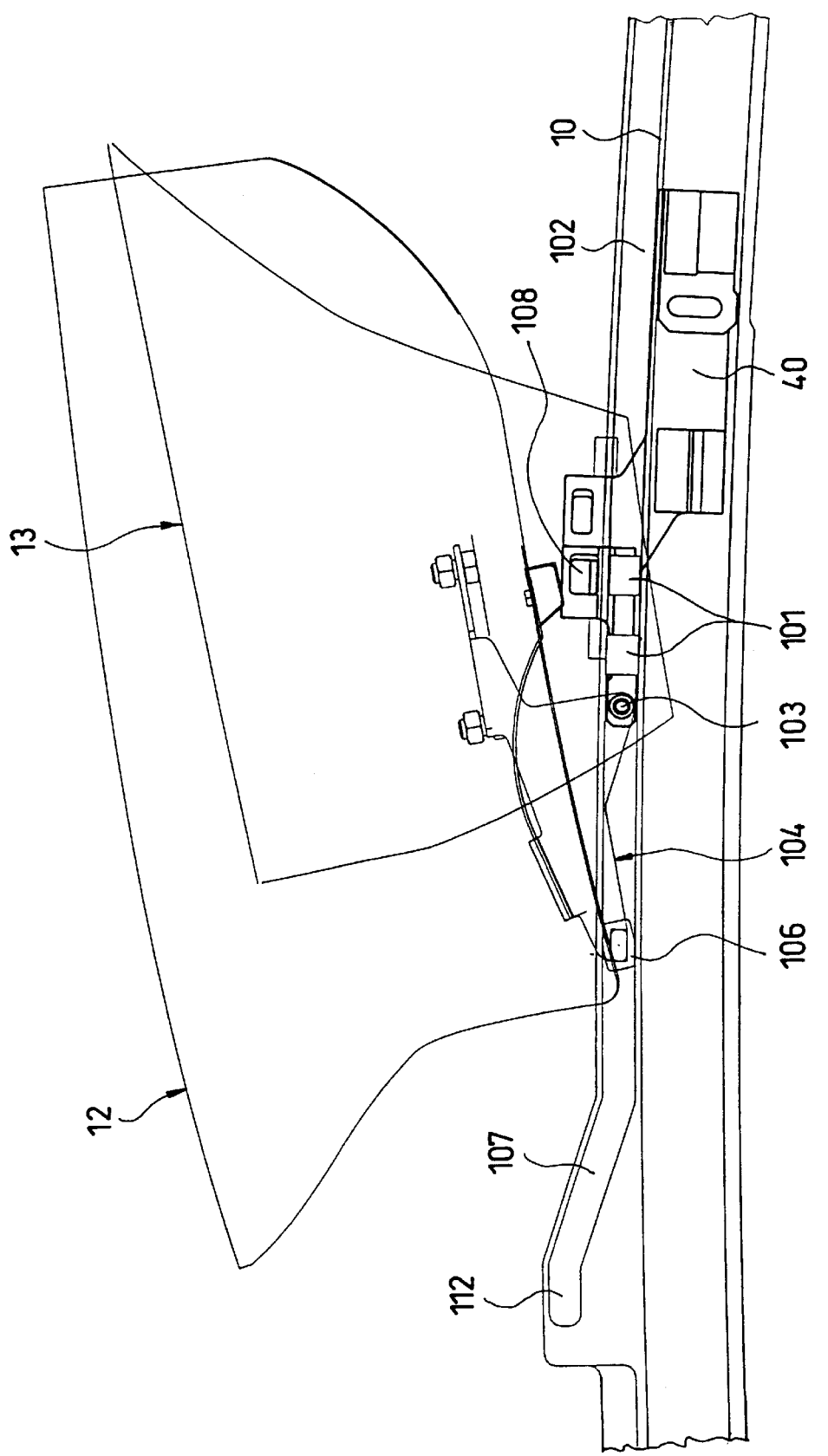
FIG. 36 is a side view as shown in FIG. 34, but with the intermediate bow pushed along the guide rail with the roof peak coupled.

In the coupled position of the roof peak 12 on the intermediate bow 13, which is shown in FIG. 36, they travel onto the guide rail section 14 on the roof cassette 6 so that the side roof rail 2 can be pivoted in and the folding roof can be lowered to the rear. The opposite sequence of motions is carried out when the folding top and the folding roof are being closed into a partially open position in which the roof peak 12 still leaves an opening clear, or into a closed position. The movably supported elements, the roof peak 12 and selectively at least one intermediate bow 13, are returned into the partially open position or into the rear position which completely clears the roof opening, and the roof peak 12 is completely returned as selectively desired to the roof cassette 6 in preparation for folding back the folding top by only one drive motor which is located, for example, on the roof cassette and via drive cable connections to the respective drive carriages which control the respective motions successively according to their respective position in forced control. Thus, this vehicle roof exhibits high operating reliability.

The described drive, coupling and locking mechanisms are also fundamentally suitable for other types of motor vehicle roofs, such as for louvered roofs or fixed component roofs, and types of folding tops as well as fixed motor vehicle roofs with roof openings which can be at least partially cleared and which can be closed by this roofs.

What is claimed is:

1. Folding top of a motor vehicle comprising:
 a roof frame with side roof rails detachably connected to a windshield apron of the motor vehicle by a locking arrangement;
 at least one movable roof element movably supported on said roof rails, and mounted to pivot relative to a main part of the roof frame; and
 a drive means for locking and unlocking the locking arrangement;
 wherein the drive means has an at least two-part drive line which extends from the main part of the roof frame to a locking part of the locking arrangement which is fixable on the windshield apron along the side roof rails, and a coupling means with which a forward part of the drive line supported on the side roof rail is couplable, in a pivoted-out position of the side roof rail, to a rear part of the drive line which is driven for locking and unlocking of the locking arrangement and which is supported on the main part of the roof frame, the forward part of the drive line being separated from the rear part of the drive line by the coupling means for pivoting of the side roof rail inward.

2. Folding top as claimed in claim 1, wherein the front part of the drive line is a drive rod which is movably supported on a guide rail of the side roof rail and which is blocked against displacement via a catch on the side roof rail which is active when the coupling means is separated.

3. Folding top as claimed in claim 1, wherein the rear part of the drive line is a rear drive rod which is supported on the main part of the roof frame and which couplable to the drive means for the movable roof element and is drivable by the drive means for locking and unlocking the locking means.

4. Folding top as claimed in claim 1, wherein a coupling engagement part of the coupling means is provided on each part of the drive line such that, when the side roof rail is pivoted out, the two coupling engagement parts are in a mutual form-fit engagement, and when the side roof rail is pivoted in, the two coupling engagement parts are separated to break the coupling.

5. Folding top as claimed in claim 4, wherein one of the coupling engagement parts is a coupling groove and one of the coupling engagement parts is a coupling journal.

6. Folding top as claimed in claim 4, wherein the coupling engagement parts engage with play in a lengthwise direction of the drive line parts.

7. Folding top as claimed in claim 1, wherein the coupling means has a centering projection located on one of the forward and rear parts of the drive line for centered engagement in a centering recess on the other of the forward and rear parts of the drive line.

8. Folding top as claimed in claim 2, wherein the catch has a catch lever which is pivotally mounted on the front drive line part and which fits into a recess on the guide rail for blocking.

9. Folding top as claimed in claim 8, wherein the catch lever is kept under pretension in a blocking direction, and when the coupling means is coupled, the coupling means is disengaged by the rear drive rod.

10. Folding top as claimed in claim 9, wherein the catch lever has a locking arm with a locking projection and a release arm for actuation by the rear drive rod.

11. Folding top as claimed in claim 1, wherein a driven drive carriage is coupled to the movable roof element and is couplable to the rear part of the drive line.

12. Folding top as claimed in claim 11, wherein the drive carriage is coupled to the rear part of the drive line via a locking block mechanism.

13. Folding top as claimed in claim 12, wherein the locking block mechanism is supported on a driver which is attached to the rear part of the drive line.

14. Folding top as claimed in claim 1, wherein a pin-shaped centering part is attached to a front end of the side roof rail for engaging a bearing of the windshield apron.

15. Folding top of a motor vehicle comprising:
 a roof frame with side roof rails detachably connected to a windshield apron of the motor vehicle by a locking arrangement;
 at least one movable roof element movably supported on said roof rails, and mounted to pivot relative to a main part of the roof frame; and
 a drive means for locking and unlocking the locking arrangement;
 wherein said at least one movable roof element is movable by a first motion of a driven drive carriage which is movably supported on the side roof rails into a rear open position in which the drive carriage is couplable to the drive means of the locking arrangement; and
 wherein another drive motion of the drive carriage is operative for actuating unlocking of the locking arrangement.

16. Folding top as claimed in claim 15, wherein the drive means has an at least two-part drive line which extends from the main part of the roof frame to a locking part of the locking arrangement which is fixable on the apron along the side roof rails and a coupling means with which a forward part of the drive line supported on the side roof rail is couplable, in a pivoted-out position of the side roof rail, to a rear part of the drive line which is driven for locking and unlocking of the locking arrangement and which is supported on the main part of the roof frame, the forward part of the drive line being separated from the rear part of the drive line by the coupling means for pivoting of the side roof rail inward; and wherein the drive carriage is coupled to the rear part of the drive line via a locking block mechanism.

17. Folding top as claimed in claim 16, wherein the locking block mechanism is supported on a driver which is attached to the rear part of the drive line.

18. Folding top as claimed in claim 15, wherein a pin-shaped centering part is attached to a front end of the side roof rail for engaging a bearing of the windshield apron.

* * * * *